US00RE48656E

(19) United States
(12) Reissued Patent
Goldner et al.

(10) Patent Number: US RE48,656 E
(45) Date of Reissued Patent: *Jul. 20, 2021

(54) SYSTEM, DEVICE, AND METHOD OF TRAFFIC DETECTION

(71) Applicant: Allot LTD., Hod-Hasharon (IL)

(72) Inventors: Alla Goldner, Tel Aviv (IL); Asaf Shahar, Kfar Saba (IL)

(73) Assignee: Allot LTD., Hod-Hasharon (IL)

( * ) Notice: This patent is subject to a terminal disclaimer.

(21) Appl. No.: 15/969,185

(22) Filed: May 2, 2018

Related U.S. Patent Documents

Reissue of:
(64) Patent No.: 9,332,133
Issued: May 3, 2016
Appl. No.: 13/958,615
Filed: Aug. 5, 2013

U.S. Applications:
(63) Continuation-in-part of application No. 13/313,134, filed on Dec. 7, 2011, now Pat. No. 8,880,023.
(Continued)

(51) Int. Cl.
*H04W 4/24* (2018.01)
*H04M 15/00* (2006.01)
(Continued)

(52) U.S. Cl.
CPC ..... *H04M 15/61* (2013.01); *H04L 12/1407* (2013.01); *H04L 12/1485* (2013.01);
(Continued)

(58) Field of Classification Search
CPC ..... H04M 15/41; H04M 15/61; H04M 15/64; H04M 15/65
(Continued)

(56) References Cited

U.S. PATENT DOCUMENTS 6,347,224 B1 2/2002 Smyth et al.
8,880,023 B2 * 11/2014 Goldner et al. ..... 455/406
(Continued)

FOREIGN PATENT DOCUMENTS

EP 2466932 A1 6/2012
EP 2648367 10/2013
(Continued)

OTHER PUBLICATIONS

International Search Report for application PCT/IB2011/055530 dated May 16, 2012.
(Continued)

*Primary Examiner* — Nick Corsaro
(74) *Attorney, Agent, or Firm* — Banner & Witcoff, Ltd.

(57) ABSTRACT

A cellular traffic monitoring system includes: a Traffic Detection Function (TDF) module to monitor cellular traffic associated with a cellular subscriber device, and to generate application detection output indicative of an application used by the cellular subscriber device; an application-based charging module to generate, based on the application detection output of said TDF module, application-based charging data related to said cellular subscriber device; a Policy Charging and Enforcement Function (PCEF) module to enforce one or more charging rules that are Service Data Flow (SDF) based and are related to said cellular subscriber device; an SDF-based charging module to generate SDF-based charging data related to said cellular subscriber device; and a charging correlator module to identify a potential over-charging due to an overlap between the application-based charging data and the SDF-based charging data.

26 Claims, 13 Drawing Sheets

Related U.S. Application Data

(60) Provisional application No. 61/680,291, filed on Aug. 7, 2012, provisional application No. 61/457,014, filed on Dec. 9, 2010.

(51) Int. Cl.
*H04L 12/14* (2006.01)
*H04L 12/725* (2013.01)
*H04L 12/26* (2006.01)
*H04W 24/08* (2009.01)

(52) U.S. Cl.
CPC ..... *H04L 43/028* (2013.01); *H04L 43/065* (2013.01); *H04L 45/306* (2013.01); *H04M 15/07* (2013.01); *H04M 15/41* (2013.01); *H04M 15/64* (2013.01); *H04M 15/65* (2013.01); *H04M 15/66* (2013.01); *H04L 45/302* (2013.01); *H04W 24/08* (2013.01)

(58) Field of Classification Search
USPC ..... 455/406
See application file for complete search history.

(56) References Cited

U.S. PATENT DOCUMENTS

| | | | | |
|---|---|---|---|---|
| 9,065,936 | B2 * | 6/2015 | Goldner | H04M 15/66 |
| 9,179,008 | B2 * | 11/2015 | Goldner | H04M 15/66 |
| 9,258,742 | B1 * | 2/2016 | Pianigiani | H04L 67/327 |
| 2006/0111077 | A1 * | 5/2006 | Hurtta | H04L 49/602 455/406 |
| 2008/0056304 | A1 * | 3/2008 | Koskinen | H04L 12/1446 370/486 |
| 2009/0141625 | A1 | 6/2009 | Ghai et al. | |
| 2009/0182883 | A1 | 7/2009 | Giaretta et al. | |
| 2010/0191612 | A1 | 7/2010 | Raleigh | |
| 2010/0287121 | A1 | 11/2010 | Li et al. | |
| 2011/0106933 | A1 * | 5/2011 | Lovsen | H04L 12/14 709/223 |
| 2011/0202485 | A1 * | 8/2011 | Cutler | H04L 41/5022 706/12 |
| 2011/0202653 | A1 | 8/2011 | Riley | |
| 2011/0208853 | A1 | 8/2011 | Castro-Castro | |
| 2011/0296489 | A1 * | 12/2011 | Fernandez Alonso | H04L 63/08 726/1 |
| 2012/0233325 | A1 * | 9/2012 | Zhou | H04L 12/1407 709/224 |
| 2013/0054800 | A1 * | 2/2013 | Fernandez Alonso | H04L 67/2842 709/224 |

FOREIGN PATENT DOCUMENTS

| | | | |
|---|---|---|---|
| WO | 2010051853 | A1 | 5/2010 |
| WO | 2012097676 | A1 | 7/2012 |

OTHER PUBLICATIONS

Feb. 21, 2018—(EP) Communication—App 13827526.8.
Mar. 4, 2016—(EP) Extended Search Report—App 13827526.8.
Feb. 12, 2014—(PCT/IB) Written Opinion of the International Searching Authority—App 2013/056394.
"3rd Generation Partnership Project; Technical Specification Group Services and System Aspects; Overall high level functionality and architecture impacts of flow based charging; Stage 2 (Release 6)", 3GPP TS23.125 V6.8.0 (Mar. 2006), pp. 1-49.
International Search Report for application PCT/IB2013/056394 dated Feb. 12, 2014.

* cited by examiner

NEW SHEET

NEW SHEET

NEW SHEET

NEW SHEET

NEW SHEET

NEW SHEET

NEW SHEET

NEW SHEET

NEW SHEET

NEW SHEET

NEW SHEET

SYSTEM, DEVICE, AND METHOD OF TRAFFIC DETECTION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a reissue of U.S. Pat. No. 9,332,133 issued May 3, 2016, filed on Aug. 5, 2013 as U.S. application Ser. No. 13/958,615, which* claims priority and benefit from U.S. Provisional Patent Application No. 61/680,291, filed on Aug. 7, 2012, which is hereby incorporated by reference in its entirety.

[This application] *U.S. application Ser. No. 13/958,615 further* is a Continuation-In-Part (CIP) of U.S. patent application Ser. No. 13/313,134, filed on Dec. 7, 2011, published on Aug. 30, 2012 as United States Patent Application Publication Number 2012/0220330, which is hereby incorporated by reference in its entirety; and which claims priority and benefit from U.S. Provisional Patent Application No. 61/457,014, filed on Dec. 9, 2010, which is hereby incorporated by reference in its entirety.

FIELD

The present invention is related to the field of wireless communication.

BACKGROUND

Many users utilize laptop computers and Personal Computers (PCs) in order to access the Internet, browse websites on the World Wide Web, send and receive electronic mail (email), perform online transactions, and engage in various other online activities. Typically, such laptop computer or PC may be connected to the Internet through a wired link or through a wireless communication link. For example, a laptop computer may connect to the Internet by utilizing one or more IEEE 802.11 wireless communication standards or protocols ("Wi-Fi"), by utilizing one or more IEEE 802.16 wireless communication standards or protocols ("Wi-Max"), or by utilizing other suitable communication standards or protocols.

In the last few years, smartphones have been introduced and have become increasingly popular. A smartphone is a hybrid mobile device which combines functions of a cellular phone with functions of a Personal Digital Assistant (PDA). Furthermore, some smartphones may include, for example, a built-in camera able to capture photographs and video clips, a high-resolution color screen able to playback videos, Global Positioning System (GPS) navigation capabilities, and/or other advanced features.

SUMMARY

In accordance with the present invention, for example, a cellular traffic monitoring system comprises: a Traffic Detection Function (TDF) module to monitor cellular traffic associated with a cellular subscriber device, and to generate application detection output indicative of an application used by the cellular subscriber device; an application-based charging module to generate, based on the application detection output of said TDF module, application-based charging data related to said cellular subscriber device; a Policy Charging and Enforcement Function (PCEF) module to enforce one or more charging rules that are Service Data Flow (SDF) based and are related to said cellular subscriber device; an SDF-based charging module to generate SDF-based charging data related to said cellular subscriber device; a charging correlator module to identify a potential over-charging due to an overlap between the application-based charging data and the SDF-based charging data.

The system may further comprise: an Application Detection and Control (ADC) module, associated with said TDF module, to generate an ADC rule indicating an identity of said application used by the cellular subscriber device; wherein the PCEF module takes into account said ADC rule for generating SDF-based charging data.

The system may further comprise: a Policy and Charging Rules Function (PCRF) to set a value of a Charging Method parameter indicating whether application-based charging or SDF-based charging is to be used in association with cellular traffic of said application used by said cellular subscriber device.

The system may further comprise: a Policy and Charging Rules Function (PCRF) to set a value of a Measurement Method parameter indicating a method of measurement for charging to be used in association with cellular traffic of said application used by said cellular subscriber device, wherein said value of the Measurement Method parameter indicates to measure charging in accordance with a charging method selected from the group consisting of: a charging method based on volume of transferred data, a charging method based on duration of transferred data, a charging method based on both duration and volume of transferred data, and an event-based charging method.

The system may further comprise: a Policy and Charging Rules Function (PCRF) to set a value of a Service Identifier Level Reporting parameter indicating whether separate usage reports are required to be generated for a current Service Identifier associated with said application used by said cellular subscriber device.

The system may further comprise: a Policy and Charging Rules Function (PCRF) set a value of a Service Identifier parameter identifying said application used by said cellular subscriber device, wherein said Service Identifier parameter and a rating group value is utilized via Multiple Services Credit Control (MSCC) per application for application-based charging.

The system may further comprise: a Policy and Charging Rules Function (PCRF) to set a value of a Charging Key parameter indicating a charging tariff to be applied if SDF-based charging is to be performed.

The system may further comprise: a Generic Tunneling Protocol (GTP) encapsulator to mark in downlink direction, within a GTP extension header, an application type associated with cellular traffic transferred in said downlink direction; wherein the PCEF module comprises a reflective QoS module to determine, based on said GTP extension header, which cellular packets belong to said application type and to avoid double-counting of said cellular packets in both SDF-based charging and application-based charging.

The system may further comprise: a Differentiated Services Code Point (DSCP) marking module to mark Internet Protocol (IP) headers of cellular packets that belong to said application used by the cellular subscriber device, as cellular packets that belong to said application; wherein the PCEF module comprises a reflective QoS module to determine, based on said IP headers marked by said DSCP marking module, which cellular packets belong to said application and to avoid double-counting of said cellular packets in both SDF-based charging and application-based charging.

The system may further comprise: a charging method selector to selectively activate or deactivate an application-based charging module and an SDF-based charging module to prevent over-charging due to an overlap between the application-based charging data and the SDF-based charging data.

The system may further comprise: a packet count adjuster to adjust a count of cellular packets transferred to said cellular subscriber device, based on output generated by said charging correlator module, to prevent over-charging due to overlap between the application-based charging data and the SDF-based charging data.

The system may utilize a charging algorithm which assumes that the SDF is non-deducible from the detected application, regardless of whether or not the SDF is deducible from the detected application.

The system may further comprise: a Policy and Charging Rules Function (PCRF) to generate a charging rule in accordance with subscriber data, and to send said charging rule to the TDF module; wherein the TDF module is to apply said charging rule within an application-based charging operation.

The system may further comprise: a Policy and Charging Rules Function (PCRF) to provide to the TDF module all downlink-direction SDFs that are covered by at least one Policy Charging and Control (PCC) rule; wherein the TDF module is to enforce a bandwidth limitation in downlink direction for said downlink-direction SDFs.

In some implementations, if said downlink-direction SDFs belong to an application that requires reporting to a charging system, then the TDF module is (a) to obtain a usage monitoring report about usage of said downlink-direction SDFs, and (b) to utilize said usage monitoring report to prevent over-charging.

In some implementations, if said downlink-direction SDFs belong to an application that requires reporting to a charging system, then the PCRF is to adjust an Application Data and Control (ADC) rule for said application in downlink direction, to match an enforcement action defined in one or more PCC Rules for said SDFs belonging to said detected application.

In some implementations, if said downlink-direction SDFs belong to an application that requires reporting to a charging system, then the TDF module is (a) to obtain Quality of Service (QoS) information about said downlink-direction SDFs, and (b) to transfer said QoS information about said downlink-direction SDFs to a charging system together with an application ID corresponding to said downlink-direction SDFs.

A method of cellular traffic monitoring may comprise: in a Traffic Detection Function (TDF) module, monitoring cellular traffic associated with a cellular subscriber device, and generating application detection output indicative of an application used by the cellular subscriber device; in an application-based charging module, generating, based on the application detection output of said TDF module, application-based charging data related to said cellular subscriber device; in a Policy Charging and Enforcement Function (PCEF) module, enforcing one or more charging rules that are Service Data Flow (SDF) based and are related to said cellular subscriber device; in an SDF-based charging module, generating SDF-based charging data related to said cellular subscriber device; in a charging correlator module, identifying a potential over-charging due to an overlap between the application-based charging data and the SDF-based charging data.

The present invention may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1A:
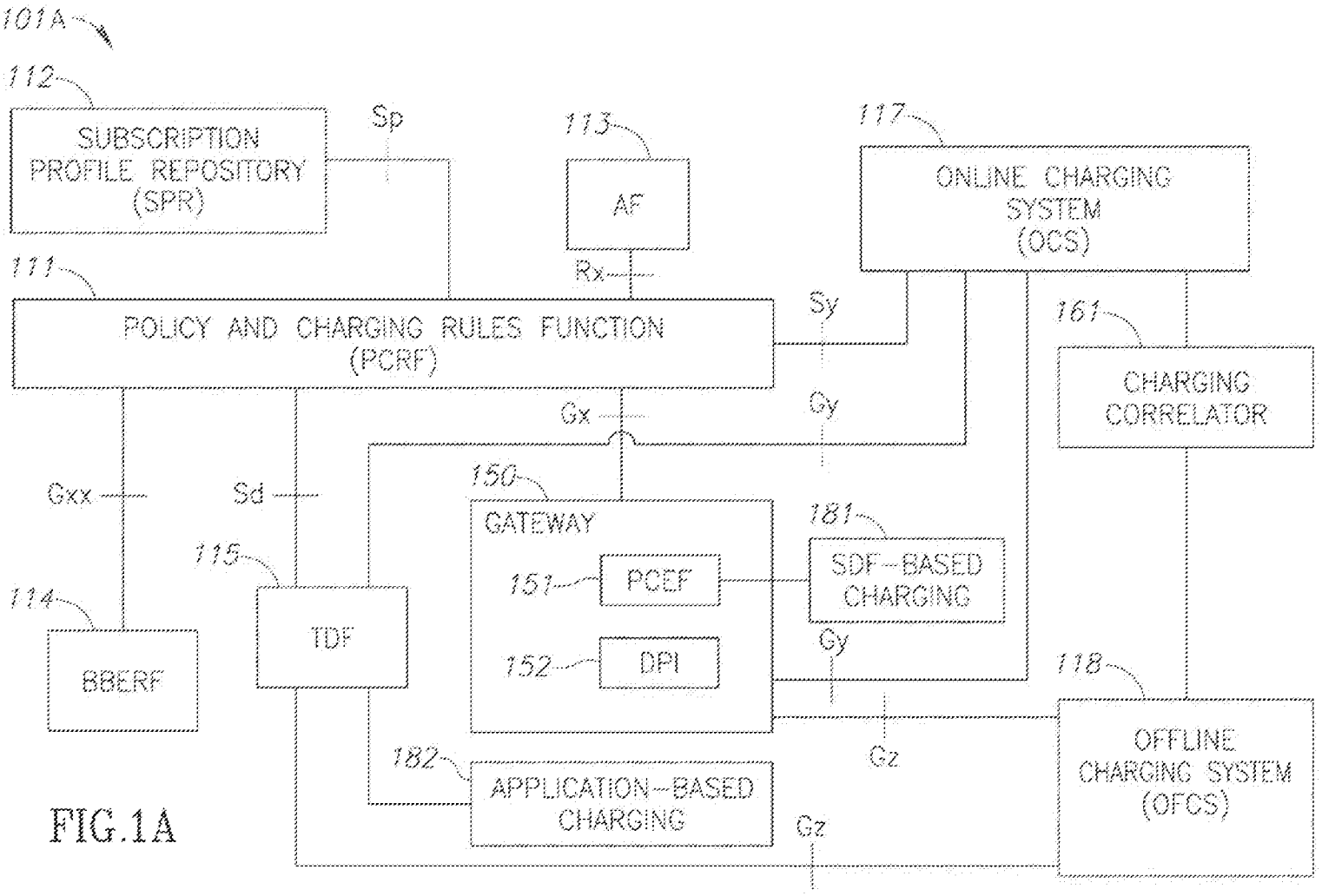
FIGS. 1A and 1B are schematic block-diagram illustrations of communication systems in accordance with the present invention.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Applicants have realized that users are increasingly utilizing smartphones in order to access the Internet and to engage in various types of online activities. Applicants have realized that it may be beneficial for cellular service providers to detect such Internet utilization which is performed via smartphones or other mobile devices, and to perform one or more particular operations in response to such detections. Such operations may include for example, traffic steering; generation of usage monitoring reports; charging operations; and/or supplemental services, e.g., content filtering, anti-virus scanning, or the like. Accordingly, the present invention may include an application-based charging system that utilizes a traffic detection function.

In accordance with 3rd Generation Partnership Project (3GPP) communications, that Policy and Charging Control (PCC) architecture may allow for a Policy and Charging Rules Function (PCRF) to provide PCC rules for enforcement by a Policy and Charging Enforcement Function (PCEF). The PCEF may control or authorize Quality of Service (QoS) and may provide specifications for Service Data Flow (SDF) based charging. Charging parameters may be transferred within PCC rules for the services which are to be charged. The charging parameters may include, for example, a Service Identifier (SI) of the SDF(s) in a PCC rule relate to, the charging key to determine the tariff to apply for the SDF(s), the charging method to be applied (online charging method, offline charging method, or no charging method to be applied), and/or a measurement method which indicates whether SDFs' data volume, duration, combined volume/duration and/or event should be measured. Based on these parameters, the PCEF may establish sessions with an Online Charging System (OCS) and/or an Offline Charging System (OFCS) and may provide SDF-based charging.

The PCC architecture may provide application awareness even when there is no explicit service level signaling. The application detection and control may be implemented, for example, by the Traffic Detection Function entity, or by the PCEF enhanced with an Application Detection and Control (ADC) function. The mechanisms of detection and, in case of solicited application reporting also the mechanisms of control (e.g., gating, bandwidth limitation, redirection, and/or usage monitoring per detected application) may be applicable also for services or applications with non-deducible SDFs. Similar to PCC Rules, ADC Rules may be defined per each application which is required to be detected and controlled. The PCRF may correlate PCC Rules and ADC Rules, for the case of TDF-based operation.

In some PCC implementations, the TDF may implement application detection and enforcement, whereas the PCEF may implement charging for Internet Protocol Connectivity Access Network (IP-CAN) session traffic. Applicants have realized that in such implementations, packets counted in the PCEF may not be delivered to their intended recipient or destination, due to enforcement actions in the TDF (e.g., gating, bandwidth limitation, and/or redirection). Applicants have thus devised methods and systems for properly counting traffic when TDF is involved in enforcement.

The present invention may utilize a communication system in which the TDF may perform both application detection and enforcement actions (e.g., gating, bandwidth limitation, redirection, and/or usage monitoring report to the PCRF 111 about consumed usage per session or per each one of the detected applications). In such system, the PCEF may perform SDF-based charging and/or bearer-based charging, and may communicate with the OCS and/or OFCS. The PCEF may be augmented with ADC capabilities, and may perform functionality which may be equivalent to or overlapping with the TDF.

The present invention may provide PCC enhancements in order to support online and offline charging for the services and applications, particularly when the TDF detects applications and performs enforcement actions as per ADC Rules (which may be received from the PCRF) and when the SDFs of the detected application(s) are non-deducible, and thus may not be transferred from the TDF to the PCEF through the PCRF.

The present invention may operate in conjunction with an application that has non-deducible SDFs. For example, each Internet Protocol (IP) based application may utilize one or more SDF(s), which may change (e.g., in a frequent manner); and such rapidly-changing or frequently-changing SDFs may not be transferred online to another entity or function in the system (or, such SDFs may be transferred to another entity in a way that causes the receiving entity performance to be significantly affected). An application having such SDF(s), may be referred to herein as an application associated with non-deducible SDF(s).

Figure 1B:
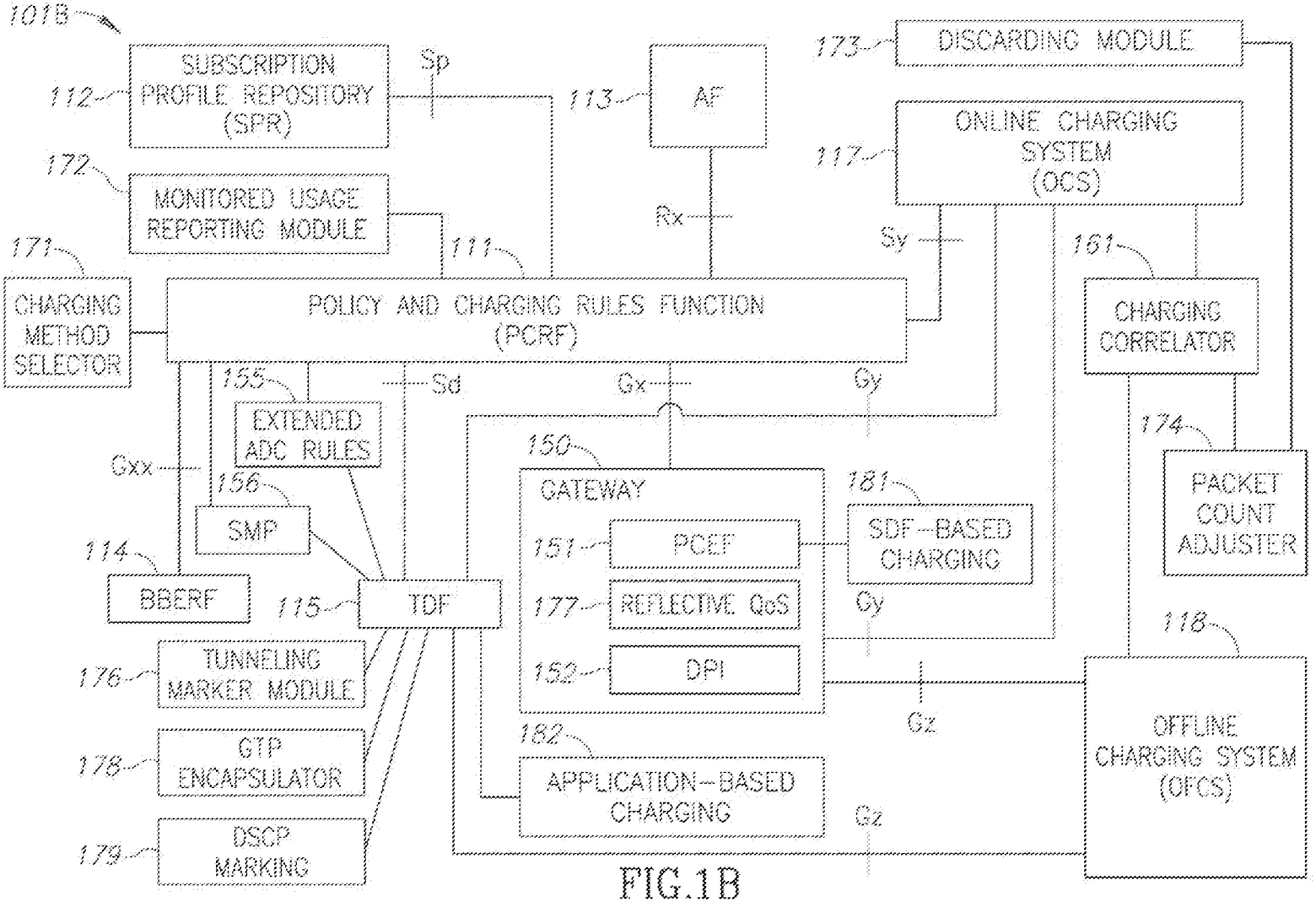

Reference is made to FIGS. 1A and 1B, which are schematic block-diagram illustrations of a communication system 101A and 101B (respectively) in accordance with the present invention. System 101A or 101B may be part of, or may be associated with, a cellular communication network, serving cellular subscriber devices, cellular phones, smartphones, tablets, or other suitable devices. Such cellular communication network may comprise, for example, at least one cell site (not shown), which in turn may comprise at least one cell radio (not shown). System 101A shows some of the main components or modules; whereas system 101B shows additional and/or optional components and/or modules. Components or modules that are discussed herein with reference to system 101B, may also be comprised in, or used by, system 101A; and vice versa.

System 101B may comprise, for example, a Policy and Charging Rules Function (PCRF) 111, which may communicate with a Subscription Profile Repository (SPR) 112 and an Application Function (AF) 113, as well as with a Bearer Binding and Event Reporting Function (BBERF) 114, a Traffic Detection Function (TDF) 115, and a gateway 150. PCRF 111 may further communicate (e.g., directly) with an Online Charging System (OCS) 117; and may further communicate with an Offline Charging System (OFCS) 118 (e.g., indirectly, via gateway 150). Each one of the components of system 101B may be implemented by utilizing suitable hardware components and/or software components, for example, processors, memory units, storage units, network elements, transmitters, receivers, transceivers, modems, wireless radios, antennas, Operating System (OS), applications, or the like.

Policy and Charging Rules Function (PCRF) 111 may aggregate data about network traffic, may take into account data from Subscription Profile Repository (SPR) 112 (or from other suitable Subscriber Profile Database (SPDB) unit), and may generate subscriber-specific traffic-handling rules and/or subscriber-specific traffic-handling decisions. Such subscriber-specific rules may be provided by PCRF 111 to TDF 115, to service gateway 150, and to a Policy and Enforcement Charging Function (PCEF) 151 which may be internal to service gateway 150 or external thereto.

In conjunction with such subscriber-specific rules and/or decisions, Traffic Detection Function (TDF) 115 may detect an application that a particular subscriber may be running, and may enforce traffic-handling rules or other suitable rules (e.g., charging, supplemental services, or the like), optionally utilizing other network elements (e.g., service gateway 150, and/or PCEF 151). TDF 115 may operate by utilizing ADC Rules received from PCRF 111.

PCEF 151 may enforce the PCC rules on SDF level, and optionally may perform charging on SDF level.

Gateway 150 may be a cellular gateway or other suitable service gateway or network element; and may comprise, for example, PCEF 151, as well as a Deep Packet Inspection (DPI) module 152 able to inspect packets and identify an application being use.

System 101B may further include, optionally, an extended Application Detection and Control (ADC) Rules function 155, able to implement application-based charging.

System 101B may further comprise, optionally, a Subscriber Management Platform (SMP) 156 for obtaining the ADC Rules and reporting further to other system components (e.g., to PCRF 111, to OCS 117, to OFCS 118). In some implementations, TDF 115 may be implemented as a combination of SMP 156 and gateway 150.

Components of system 101B, and particularly, TDF 115 and/or PCRF 111, may utilize Enhanced ADC Rules which may be determined or generated by Enhanced ADC Rules Function 155, and may enable application-based charging (e.g., in addition to parameters defined in 3GPP TS 23.203).

The Enhanced ADC Rules may comprise, for example, charging rules and parameters enabling to define identities and instructions for charging and accounting, which may be used by an access point where application-based charging is configured. For example, a Charging Key parameter may be used by a charging system (e.g., OCS 117 and/or OFCS 118) to determine the tariff to apply for an application that is subject to application-based charging.

The Enhanced ADC Rules may comprise, for example, Application Identifier or Service Identifier rules or parameter(s), indicating the identity of an application and/or service being used by the subscriber and being subject to application-based charging and/or to SDF-based charging. Application Identifier parameters or Service Identifier parameters may comprise, for example, a Charging Method parameter indicating a required charging method for the applicable ADC Rule (e.g., online application-based charging, offline application-based charging, or no application-based charging). Additionally, a Measurement Method parameter may indicate whether the application data volume, duration, combined volume/duration, and/or event is (or are) to be measured, for application-based charging purposes (this may be applicable for reporting, if the charging method is online or offline; whereas event-based charging may be applicable to pre-defined ADC rules). Additionally, a Service Identifier Level Reporting parameter may indicate that separate usage reports are to be generated for the current Service Identifier, e.g., having a binary value of "required" (or mandated) or "not required").

The Service Identifier may be implemented as a new parameter which may be transferred to the charging system (e.g., to OCS 117 and/or OFCS 118) within Multiple Services Credit Control (MSCC) per each application (e.g., instead of Service Identifier) for application-based charging. In some implementations, if there is at least one ADC Rule that contains or refers to charging parameters, then the session with OCS 117 or OFCS 118 may need to be established by the TDF.

Some implementations may operate to ensure that over-charging is not performed, even if both PCEF 151 and TDF 115 report for charging (e.g., to OCS 117 and/or to OFCS 118). Some components of system 101B may assume that the SDF(s) of the detected application (e.g., detected by TDF 115) are non-deducible; however, this does not necessarily preclude that TDF 115 is actually aware of those SDF(s). Some implementations may assume that some of the SDF(s), that are enforced by PCEF 151 based on PCC Rules received from PCRF 111, belong also to the application detected and enforced by TDF 115; otherwise, there may not be a need to correlate charging reports, as no over-charging would be performed even if PCEF 151 and TDF 115 both report for charging.

In accordance with the present invention, system 101B may utilize a charging model per session which may require one of the following: (a) only application usage charging is required for the corresponding IP-CAN session; or (b) only SDF-based charging is required for the corresponding IP-CAN session; or (c) both SDF-based charging and application usage charging are required for the corresponding IP-CAN session. Each one of these alternative requirements may trigger a different set of operations, as described herein.

If only application usage charging is required for the corresponding IP-CAN session, then the following operations may be used. For event-based charging, there is no need to perform charging correlation, as, for example, Application ID or an Application instance ID number is reported. For time-based charging, there is no need to perform charging correlation, as time per application usage (or time per SDF usage) is to be reported to the charging system(s). For volume-based charging, or for time-and-volume based charging, the following may be performed: In the uplink direction, TDF 115 may receive correct information as packets pass through TDF 115 after any possible enforcement action done by PCEF 151. In order to charge for correct downlink information, PCRF 111 may provide to TDF 115 all the SDFs that are part of PCC Rules, in case there is any bandwidth limitation in the downlink direction for those SDFs (otherwise, this operation may not be required, as TDF 115 may correctly perform the charging). If those SDFs belong also to the application which needs to be reported to the charging systems, then TDF 115 may request from PCRF 111 (and in turn, PCRF may request from PCEF 151) to provide usage monitoring report about those SDFs usage, and the monitoring report may be reported back from PCEF 151 through PCRF 111 to TDF 115. Accordingly, TDF 115 may have correct information about usage, and may send to OCS 117 and/or to OFCS 118 accurate reports without over-charging. Alternatively, PCRF 111 may adjust the ADC Rules for the application in the downlink direction, if appropriate, to match the same enforcement action as defined in the PCC Rules for the SDFs, belonging to the detected application. Optionally, PCRF 111 may transfer to TDF 115 also full QoS-information for those SDFs, and thus TDF 115 may also transfer the QoS information to the charging systems (OCS 117 and/or OFCS 118) along with the Application ID to mention the SDF(s) belonging to it (which are enforced in downlink direction by PCEF 151). In this case, TDF 115 is the exclusive charging reporting entity. The charging for all applications may be performed by using charging parameters within the ADC Rules.

If only SDF usage charging is required for the corresponding IP-CAN session, then the following operations may be performed. For event-based charging, there is no need to perform charging correlation, and event-based SDF reporting may be used. For time-based charging, there is no need to perform charging correlation, and time-based SDF reporting may be used. For volume-based charging, or for time-and-volume based charging, the following operations may be performed. In the downlink direction, PCEF 151 obtains correct information as packets pass through PCEF 111 after any possible enforcement action done by TDF 115. In order to charge correctly for uplink information, PCRF 111 may provide to TDF 115 all the SDFs that are part of PCC Rules. In case one or more of those SDFs belong to detected application(s), then the following may be performed. If there is any bandwidth limitation or gating or redirection in the uplink direction for those SDFs as a part of the enforced application (otherwise, no need for this operation as PCEF 151 may correctly perform the charging), then TDF 115 informs PCRF 111 by providing those SDFs belonging to the application with their enforcement action, and/or with an indication of which ADC Rule(s) they belong to. PCRF 111 may then adjust the enforcement and charging model for PCEF 151 by, for example, creating one or more new PCC Rule(s) for those SDFs with a higher priority. If zero charging is detected (e.g., in case of redirection), then the bandwidth limitation of those SDFs may be adjusted to the values provided to TDF 115 per application (i.e., per the application that includes, or is assumed to include, those SDFs). Accordingly, PCEF 151 may have correct information about usage, and may send to OCS 117 and/or to OFCS 118 accurate charging reports without over-charging. In this case, PCEF 151 is the only charging reporting entity. The charging for all PCC Rules may be performed by utilizing SDF charging principles.

If both SDF-based charging and application usage charging are required for the corresponding IP-CAN session, then the following operations may be performed. For event-based charging, there is no need for charging correlation, and system 101B may utilize event-based SDF reporting and application-based charging for Application Instance identifier events. For time-based charging, there is no need for charging correlation, as the PCC Rules may include also other SDFs and the detected application may also include one or more other SDFs; and therefore the effective time measured for PCC and/or ADC Rule is not affected. For volume-based charging, or for volume-and-time based charging, the following set of operations may be performed. Firstly, PCC Rules for SDF-based charging may be provided (e.g., by PCRF 111) to PCEF 151, and ADC Rules for application-based charging may be provided (e.g., by PCRF 111) to TDF 115. Then, PCRF 111 may provide to TDF 115 all the SDFs from the corresponding PCC Rules. If some of those SDFs belong to the detected application, which needs to be enforced and/or charged, then the following operations may be performed, described herein with regard to the uplink direction and the downlink direction In the uplink direction, if TDF 115 performs enforcement actions but does not need to charge per this specific application, in order to correlate for the impacted SDFs, TDF 115 may inform PCRF 111 by providing those SDFs belonging to application with their enforcement action and/or with indication of which ADC Rule(s) they belong to. Then, PCRF 111 may adjust the enforcement and charging model for PCEF 151, for example, by creating one or more new PCC rule(s) for those SDFs with a higher priority; and in case of zero charging (e.g., in case of redirection), adjusting bandwidth limitation of those SDFs to the values provided to TDF 115 per application which includes (or is assumed to include) those SDFs. Thus, PCEF 151 may have correct information about usage, and may send to OCS 117 and/or to OFCS 118 correct reports without over-charging. However, this does not necessarily preclude charging of PCEF 151 for any additional PCC Rules which do not include those SDFs and any applications for the same IP-CAN session.

In the uplink direction, if TDF 115 performs enforcement actions and needs to charge per this specific application, then TDF 115 may inform PCRF 111 by providing those SDFs belonging to application with their enforcement action and/or indication of which ADC Rule(s) they belong to. Then, PCRF 111 may adjust the enforcement and charging model for PCEF 151, for example, by creating one or more new PCC rule(s) for those SDFs with a higher priority; and when having zero charging (e.g., in case of redirection), adjusting bandwidth limitation of those SDFs to the values provided to TDF 115 per application which include (or are assumed to include) those SDFs. Then, PCRF 111 may signal to TDF 115 whether or not those SDFs should be counted for application-based; an indication not to count for application-based charging means that those SDFs are to be counted within PCC Rules only. Optionally, such indication may also be part of ADC Rule. If those SDFs are to be counted by TDF 115, and PCRF 111 adjusted the PCC Rules for those SDFs, then charging is correctly performed. Otherwise, if SDFs need to be excluded from TDF's 115 counting per application, then TDF 115 may provide application-based charging for all accumulated traffic excluding the SDFs that are also reported by PCC Rules.

In the downlink direction, if PCEF 151 performs enforcement actions per PCC Rules with the affected SDFs, but does not need to charge per this specific SDF, then PCRF 111 may provide to TDF 115 all SDFs that are part of PCC Rules, in case there is any enforcement action (e.g., bandwidth limitation) in the downlink direction for those SDFs (otherwise, no need for this operation as TDF 115 may correctly perform charging). If those SDFs belong also to the application which needs to be reported, then TDF 115 may request from PCRF 111 (which in turn may request from PCEF 151) to provide usage monitoring report about those SDFs usage; and PCEF 151 may provide such usage monitoring report via PCRF 111 to TDF 115. Thus, TDF 115 may have correct information about usage, and may send to OCS 117 and/or to OFCS 118 correct charging reports without over-charging. Alternatively, PCRF 111 may adjust ADC Rules for the application in the downlink direction, if appropriate, to match the same enforcement action as defined in PCC Rules for the SDFs belonging to the detected application. Optionally, PCRF 111 may transfer to TDF 115 also full QoS-Information for those SDFs, and thus TDF 115 may also transfer the full QoS Information to OCS 117 (along with Application ID to mention the SDFs belonging to it (which are enforced in the downlink direction by PCEF 151) with their QoS-Information). This may not necessarily preclude charging of PCEF 151 for any additional PCC Rules which do not include such SDF and any applications for the same IP-CAN session.

In the downlink direction, if PCEF 151 performs enforcement actions and needs to charge per this specific SDF, then PCRF 111 may provide to TDF 115 all SDFs which are part of affected PCC Rules. If those SDFs belong also to the application which needs to be reported, then TDF 115 may request from PCRF 111 (which, in turn, may request from PCEF 151) to provide usage monitoring report; and PCEF 151 may provide the usage monitoring report via PCRF 111 to TDF 115, about those SDFs usage. Thus, TDF 115 may have correct information about usage, and may send to OCS 117 and/or to OFCS 118 correct charging reports without over-charging. Alternatively, PCRF 111 may adjust ADC Rules for the application in the downlink direction, if appropriate, to match the same enforcement action as defined in PCC Rules for the SDF(s) belonging to the detected application. Optionally, PCRF 111 may transfer to TDF 115 also full QoS-Information for those SDFs, and TDF 115 may also transfer the full QoS Information to OCS 117 (along with the Application ID to mention the SDF(s) belonging to it (which may be enforced in the downlink direction by PCEF 151) with their respective QoS-Information).

Other suitable sets of operations, or conditions or parameters, may be used such that PCRF 111 may control and ensure that TDF 115 and/or PCEF 151 correctly report the charging for those SDFs that are supposed to be charged by both of these module, but without double-charging or over-charging.

Optionally, system 101B may comprise a charging correlator 161, which may be implemented, for example, as a stand-alone unit or module able to communicate with other component(s) of system 101B, as part of PCRF 111, as part of OCS 117, or as part of OFCS 118. In some implementations, for example, charging correlator 161 may correlate or perform adjustment to data generated by, or utilized by, an application-based charging module 182 (e.g., which may be associated with TDF 115) and/or an SDF-based charging module 181 (e.g., which may be associated with PCEF 151). Optionally, charging correlator 161 may utilize other modules or elements, for example, packet count adjuster 174 described herein.

In a demonstrative example, correlation of charging reports may be performed by PCRF 111, which may optionally comprise charging correlator 161. For example, PCRF 111 may provide PCC Rules for SDF-based charging to PCEF 151, and may provide ADC-based Rules for application-based charging to TDF 115. The ADC-based charging rules may begin to be enforced only when an application is detected to be running on the subscriber's device. Since the SDFs of the application may be non-deducible (and thus PCRF 111 may not recognize them), in order to avoid double-charging or over-charging, only charging models where either SDF-based charging or application-based charging may be enabled, but not both charging models simultaneously. In the uplink direction, TDF 115 may perform enforcement action per detected application (e.g., traffic gating, traffic shaping, traffic redirection), and if such enforcement action is required, then system 101B may switch from SDF-based charging to application-based charging upon application detection. PCRF 111 may ensure there is no overlap or over-charging; such as, when an application that needs to be charged is detected, the charging is switched off for PCC Rules (i.e., for charging on the SDF level). In this method, both PCEF 151 and TDF 115 may provide charging reports to the charging system(s), and PCRF 111 may ensure that double-charging is avoided.

Alternatively, correlation of charging reports may be performed by the charging system(s), for example, by OCS 117 and/or OFCS 118; which may optionally utilize charging correlator 161 for this purpose. For example, PCRF 111 may provide PCC Rules for SDF-based charging to PCEF 151, and may provide ADC Rules for application-based charging to TDF 115. The ADC charging rules may begin to be enforced only when an application is detected to be running on the subscriber's device. The SDFs of the application may be non-deducible (and thus PCRF 111 may not be aware of them), and thus, in order to avoid double charging or over-charging, only charging models where either SDF-based charging or application-based charging may be enabled, but not both charging models simultaneously. In the uplink direction, TDF 115 may perform enforcement action per detected application (e.g., traffic gating, traffic shaping, traffic redirection), and thus, if such enforcement action is required, system 101B may switch from SDF-based charging to application-based charging upon application detection. This may be done by OCS 117 and/or by OFCS 118; for example, starting at the point in time (e.g., by using timestamp) in which charging request per application is received, then charging per SDF is ignored or discarded via a discarding module 173 (e.g., which may be part of OCS 117 and/or OFCS 118, or may be associated with such components). In this method, both PCEF 151 and TDF 115 may provide charging reports, and the charging system(s), for example, OCS 117 and/or OFCS 118 may operate to avoid double-charging or over-charging.

System 101B may report the monitored usage, per detected application, via a suitable route of components; for example, a report request going from TDF 115 to PCRF 111 to PCEF 151, and, a report response going from PCEF 151 to PCRF 111 to TDF 115; optionally utilizing a monitored usage reporting module 172 (e.g., which may be part of PCEF 151 and/or PCRF 111, or may be associated therewith). For example, PCRF 111 may inform TDF 115 about SDF(s) reported for charging by PCEF 151. In response, or at any point of time subsequently, if those SDF(s) belong to one or some of the detected applications, then TDF 115 may request (indirectly through PCRF 111) to receive from PCEF 151 (indirectly through PCRF 111) report usage monitoring per those SDF(s). Usage monitoring may be performed and/or reported by volume, by time, or by volume-per-time. Usage monitoring and/or reporting may also be done on demand, for example, every time that TDF 115 has to report application-based charging to charging function(s). When reporting to the charging function(s) (e.g., to OCS 117 and/or OFCS 118), TDF 115 may reduce SDF volume/time, as reported by usage monitoring, and may thus provide accurate information per application(s). In this method, both PCEF 151 and TDF 115 may provide charging reports.

Optionally, system 101B may utilize Sy interface enhancements to carry application-level reports, for example, from TDF 115 through PCRF 111 to OCS 117. For example, both PCEF 151 and TDF 115 may report (based on SDF and/or on application level). Sy interface may be extended with usage monitoring report from PCRF 111 to OCS 117 per detected application(s) and/or per SDF(s). It may be required to report to OCS 117 if the SDF(s) are also part of the detected application's traffic. Then, OCS 117 may reduce or deduct the SDF(s) reported, from the total application's consumed traffic amount, thereby avoiding or preventing double-charging or over-charging. In this method, both PCEF 151 and TDF 115 may provide charging reports.

System 101B may optionally utilize a tunneling protocol, which may be defined, established and utilized between PCEF 151 and TDF 115. In the downlink direction, TDF 115 may mark (e.g., by using an optional tunneling marker module 176) all IP packets belonging to the detected application, by using a field dedicated for this purpose in the tunneling protocol header. Then, PCEF 151 may, for example, utilize reflective QoS functionality (e.g., by utilizing an optional Reflective QoS module 177), and may detect which IP packets belong to the detected application, thereby avoiding an over-count or double-count of those IP packets while reporting SDF-based charging and/or application-based charging. In this method, PCEF 151 may be the only enforcing and also charging reporting entity, and TDF 115 may not report charging.

System 101B may optionally utilize an extended or improved version of Generic Tunneling Protocol (GTP) encapsulation, for example, in case of TDF 115 deployment in network(s). For example, GTP extension header for Service Identification for RRC Improvements in GERAN (SIRIG) (3GPP R-11) may be utilized (e.g., by using an optional GTP Encapsulator 178) to mark the application type in the downlink. Then, PCEF 151 may utilize reflective QoS functionality to determine which packets belong to the detected application, thereby avoiding packet over-count or packet double-count while reporting SDF-based charging and/or application-based charging. In this method, PCEF 151 may be the only enforcing and also charging reporting entity, and TDF 115 may not report charging.

System 101B may optionally re-use Differentiated Services Code Point (DSCP) values for packet marking. For example, each ADC rule that is provided to TDF 115, may insert or may include a DSCP value (e.g., by using an optional DSCP marking module 179) to mark packets belonging to specific application in the IP header. The ADC Rules may not include enforcement actions. TDF 115 may report to PCRF 111 about the detected application, and PCRF 111 may inform PCEF 151 which DSCP value in the IP header corresponds to which detected application. PCEF 151 may utilize reflective QoS functionality to detect which packets belong to the detected application in the uplink direction, thereby avoiding packet over-count or packet double-count while reporting SDF-based charging and/or application-based charging. In this method, PCEF 151 may be the only enforcing and also charging reporting entity, and TDF 115 may not report charging.

The present invention may utilize one or more dedicated modules, which may be stand-alone modules or may be integrated within other component(s) of system 101B (e.g., within PCRF 111, within TDF 115, within PCEF 151). Such optional modules or functions may include, for example, a charging method selector 171 able to select, activate or de-activate charging method(s), or able to enable/disable SDF-based charging, or able to enable/disable application-based charging. Such optional modules or functions may include, for example, a packet count adjuster 174 able to adjust, modify, increase or decrease packet count, for example, in OCS 117 and/or in OFCS 118, in order to compensate for (or prevent) double-counted packets due to carrying on of both SDF-based charging and application-based charging. Other suitable modules or functions may be used.

*FIGS. 2A-2M are flow diagrams illustrating the operation of a cellular traffic monitoring system according to the disclosure. In step 201, a Traffic Detection Function (TDF) module monitors cellular traffic associated with a cellular subscriber device. In step 203, the TDF module generates application detection output indicative of an application used by the cellular subscriber device. In step 205, an application-based charging module generates, based on the application detection output of the TDF module, application-based charging data related to the cellular subscriber device. In step 207, a Policy Charging and Enforcement Function (PCEF) module enforces one or more charging rules that are Service Data Flow (SDF) based and are related to the cellular subscriber device. In step 209, an Application Detection and Control (ADC) module, associated with the TDF module, generates an ADC rule indicating an identity of the application used by the cellular subscriber device before proceeding to step 211. Alternatively, step 211 may be proceeded to directly after step 207, where in step 211 an SDF-based charging module generates SDF-based charging data related to the cellular subscriber device. If following step 209, in step 211, the PCEF module takes into account the ADC rule for generating SDF-based charging data. In step 213, a charging correlator module identifies a potential over-charging due to an overlap between the application-based charging data and the SDF-based charging data. Alternatively, the process may proceed starting at step 203.*

Figure 2A:
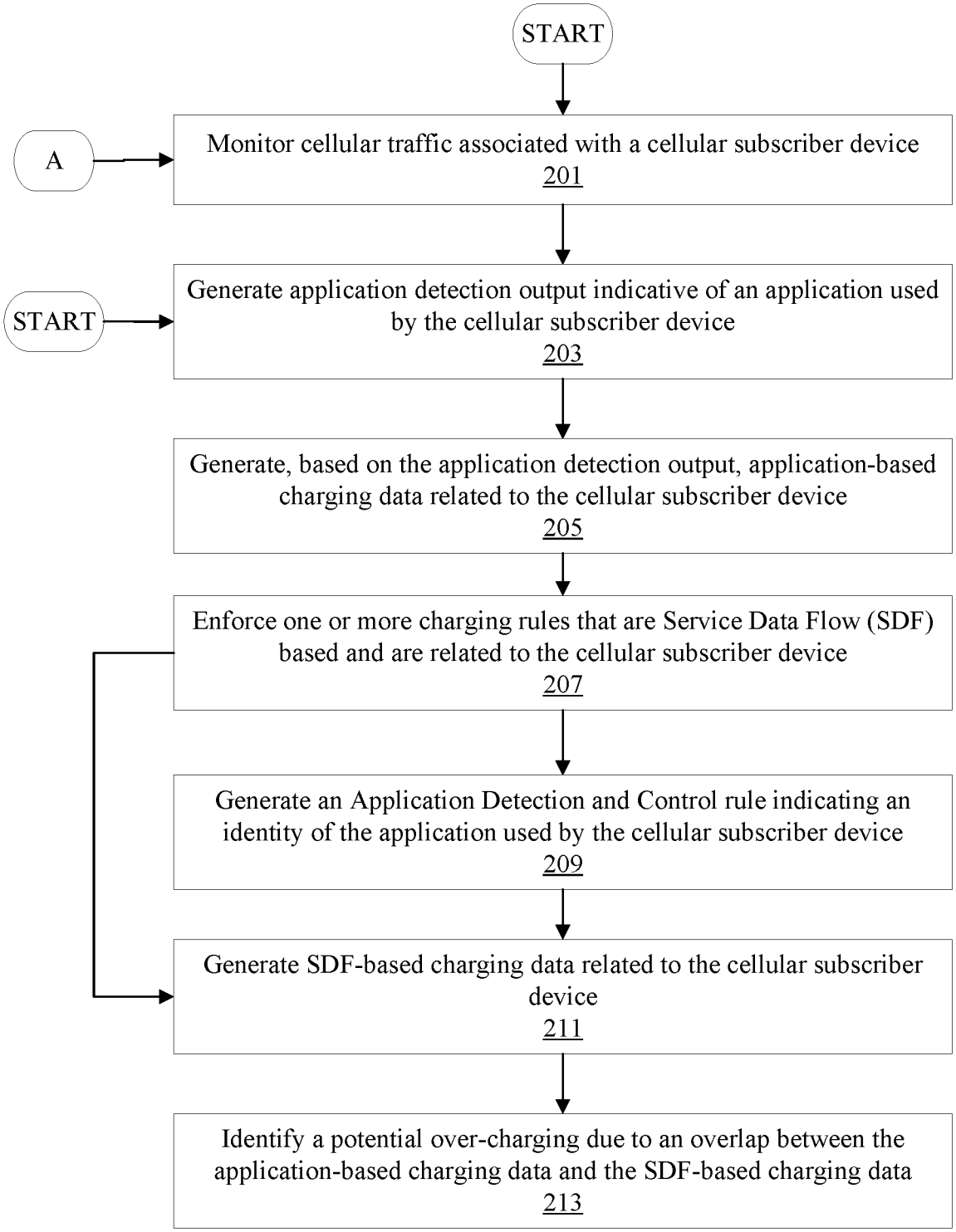
*FIGS. 2A-2M are flow diagrams illustrating the operation of a cellular traffic monitoring system according to the disclosure.*
Figure 2B:
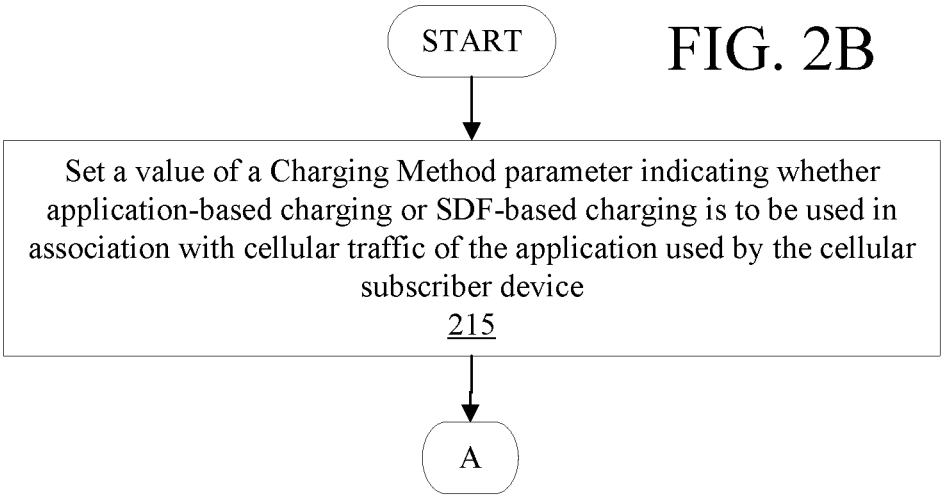
Figure 2C:
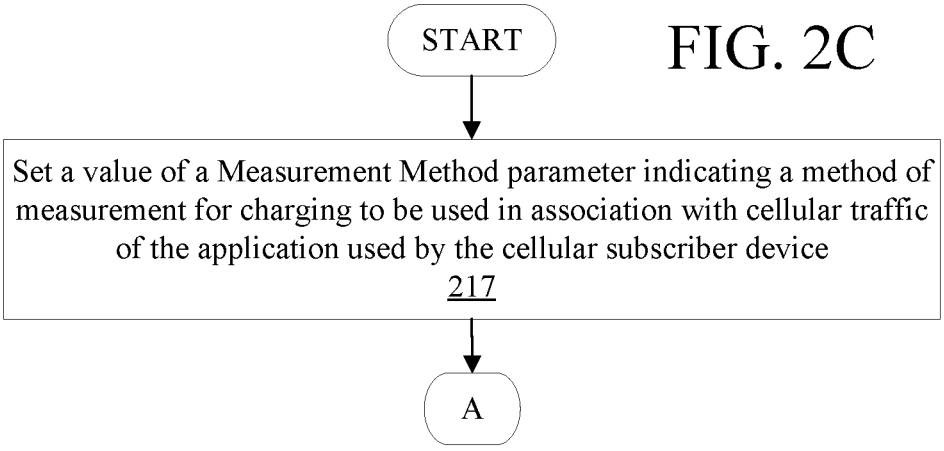
Figure 2D:
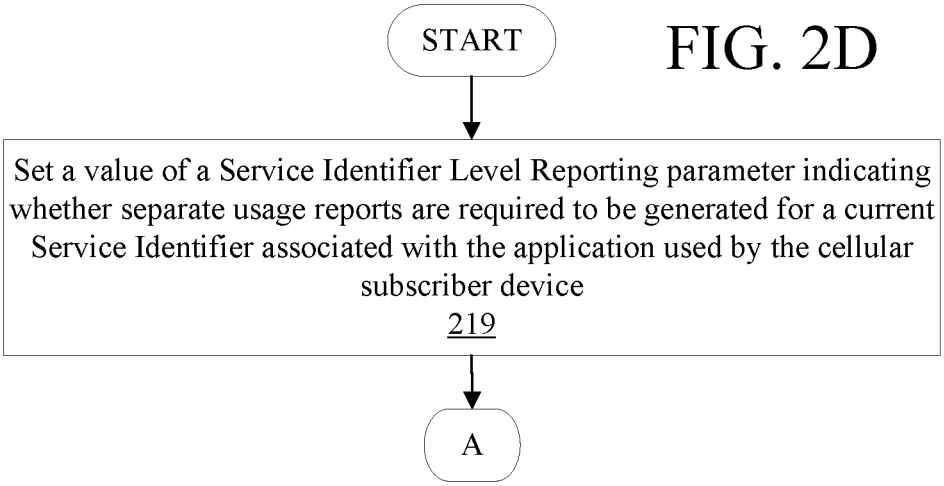
Figure 2E:
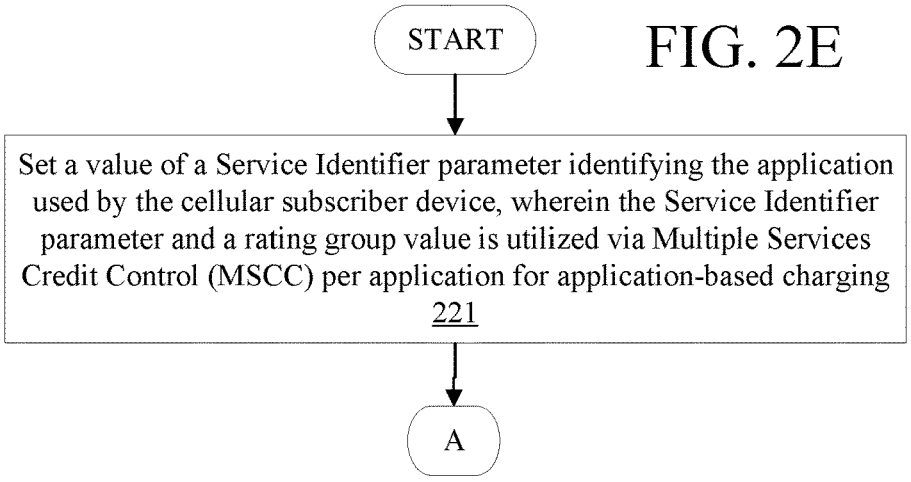
Figure 2F:
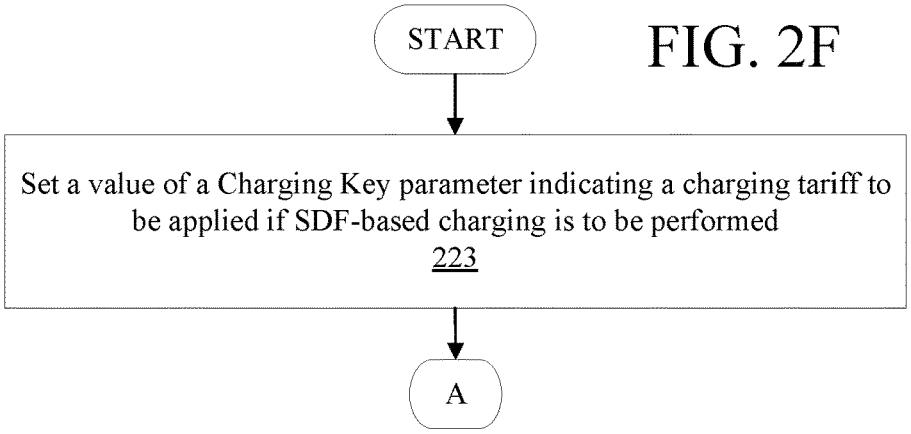
Figure 2G:
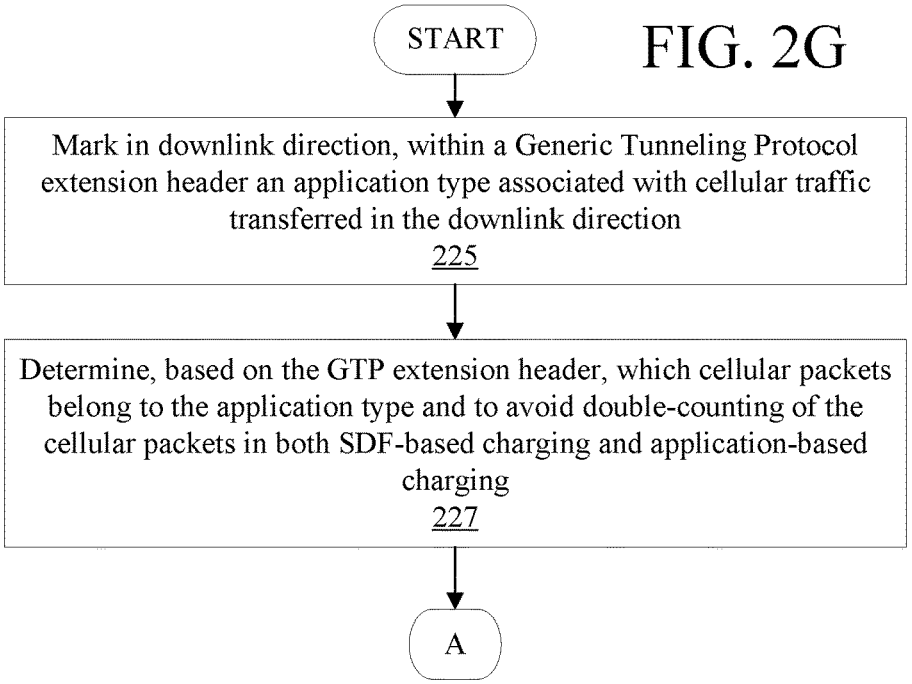
Figure 2H:
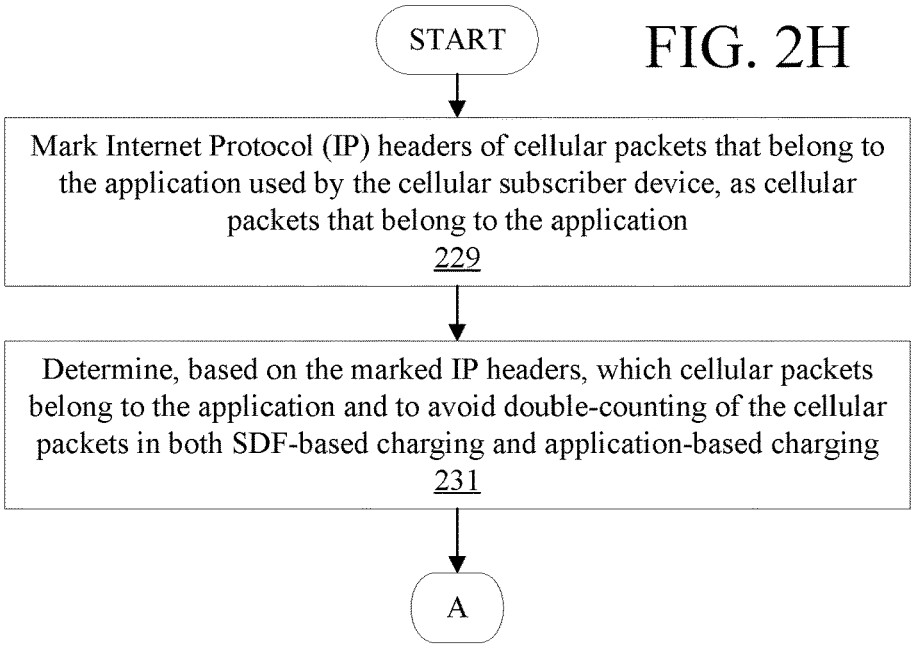
Figure 2I:
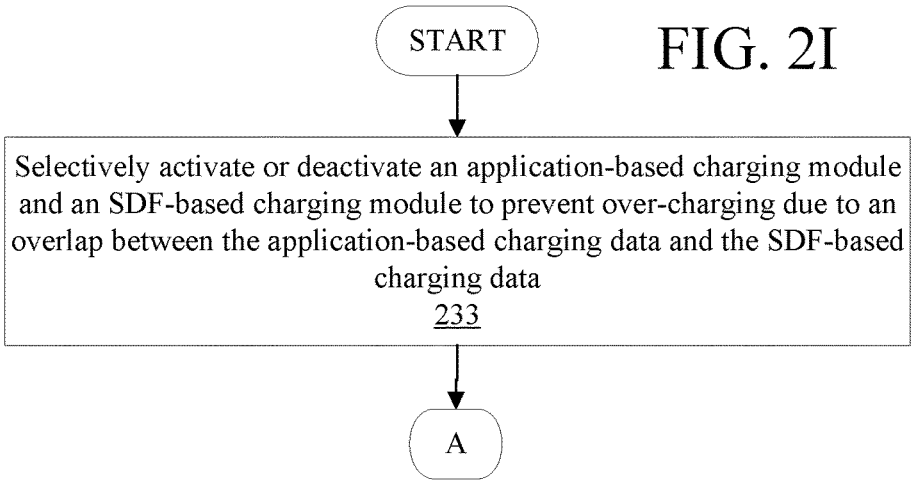
Figure 2J:
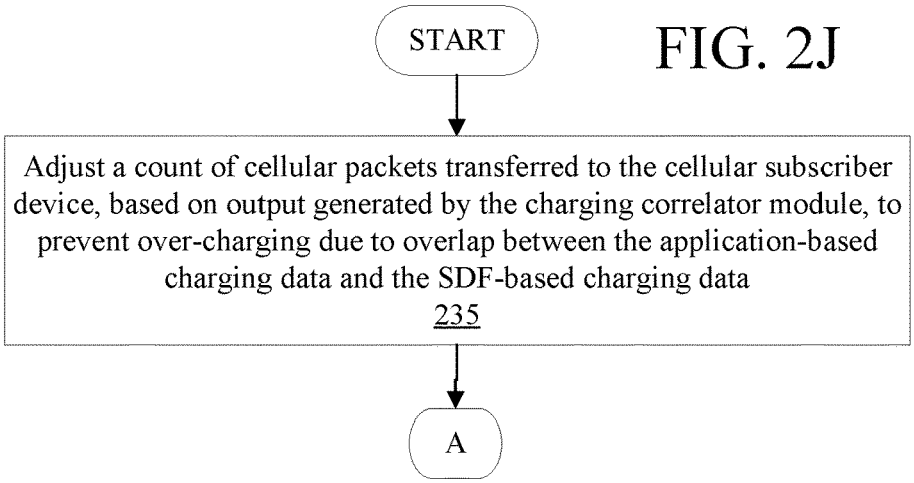
Figure 2K:
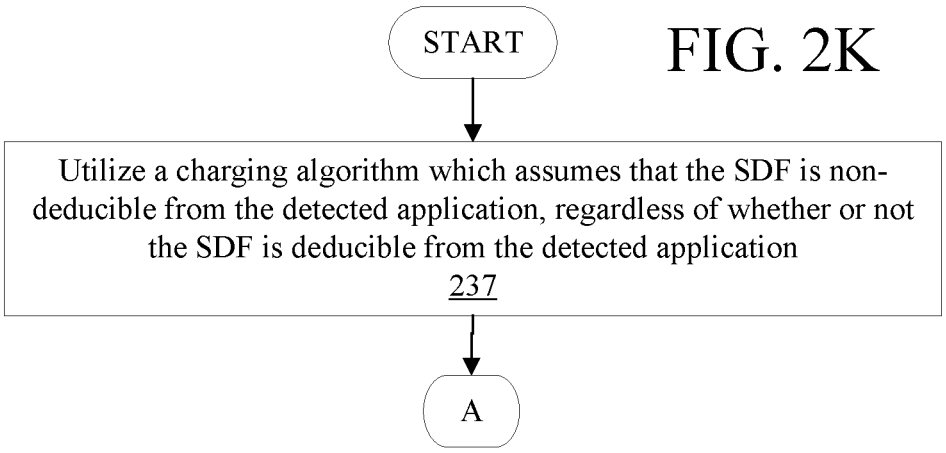
Figure 2L:
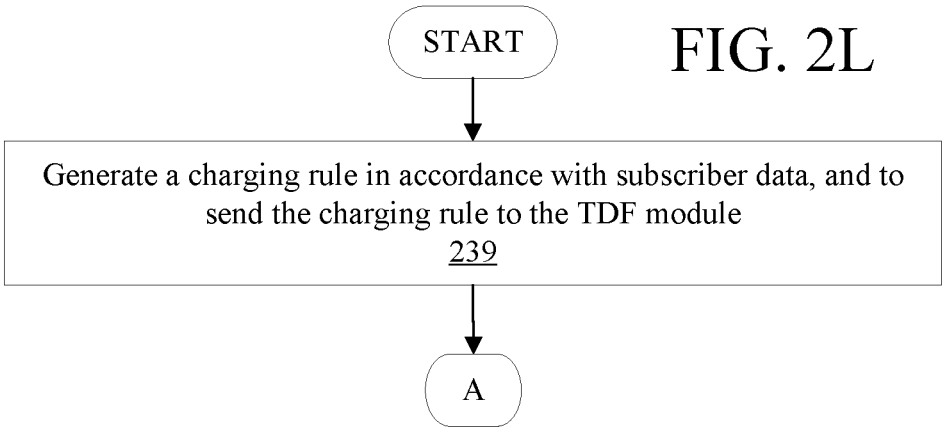
Figure 2M:
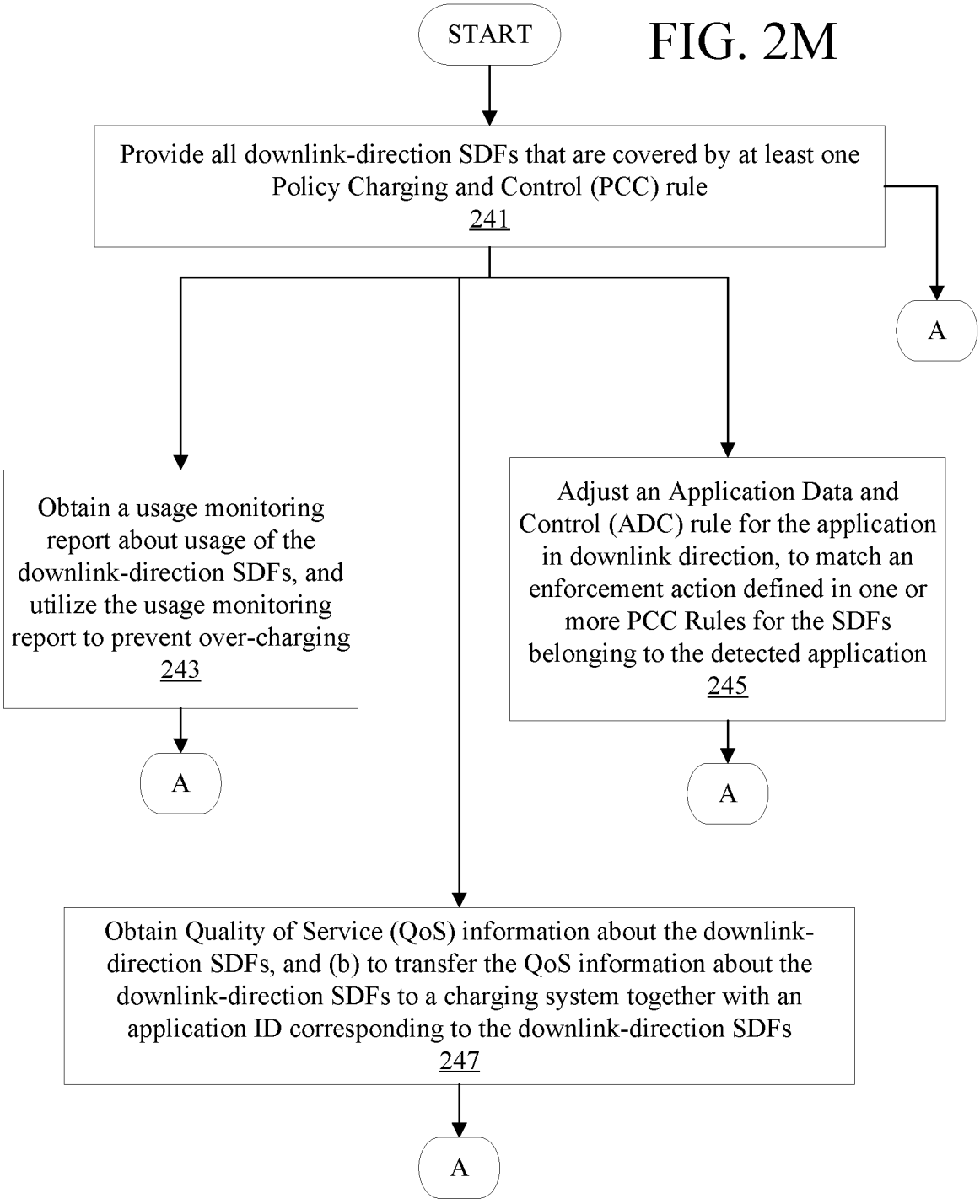

*In step 215 in FIG. 2B, a Policy and Charging Rules Function (PCRF) sets a value of a Charging Method parameter indicating whether application-based charging or SDF-based charging is to be used in association with cellular traffic of the application used by the cellular subscriber device before proceeding to step 201. In step 217 in FIG. 2C, a PCRF sets a value of a Measurement Method parameter indicating a method of measurement for charging to be used in association with cellular traffic of the application used by the cellular subscriber device before proceeding to step 201. In step 219 in FIG. 2D, a PCRF sets a value of a Service Identifier Level Reporting parameter indicating whether separate usage reports are required to be generated for a current Service Identifier associated with the application used by the cellular subscriber device before proceeding to step 201. In step 221 in FIG. 2E, a PCRF sets a value of a Service Identifier parameter identifying the application used by the cellular subscriber device, wherein the Service Identifier parameter and a rating group value is utilized via Multiple Services Credit Control (MSCC) per application for application-based charging before proceeding to step 201. In step 223 in FIG. 2F, a PCRF sets a value of a Charging Key parameter indicating a charging tariff to be applied if SDF-based charging is to be performed before proceeding to step 201. In step 225 in FIG. 2G, a Generic Tunneling Protocol (GTP) encapsulator marks in downlink direction, within a GTP extension header, an application type associated with cellular traffic transferred in the downlink direction. In step 227, the PCEF module comprises a reflective QoS module to determine, based on the GTP extension header, which cellular packets belong to the application type and to avoid double-counting of the cellular packets in both SDF-based charging and application-based charging before proceeding to step 201. In step 229 in FIG. 2H, a Differentiated Services Code Point (DSCP) marking module marks Internet Protocol (IP) headers of cellular packets that belong to the application used by the cellular subscriber device, as cellular packets that belong to the application. In step 231, a reflective QoS module, of the PCEF module, determines, based on the IP headers marked by the DSCP marking module, which cellular packets belong to the application and to avoid double-counting of the cellular packets in both SDF-based charging and application-based charging before proceeding to step 201. In step 233 in FIG. 2I, a charging method selector selectively activates or deactivates an application-based charging module and an SDF-based charging module prevents over-charging due to an overlap between the application-based charging data and the SDF-based charging data before proceeding to step 201. In step 235 in FIG. 2J, a packet count adjuster adjusts a count of cellular packets transferred to the cellular subscriber device, based on output generated by the charging correlator module, to prevent over-charging due to overlap between the application-based charging data and the SDF-based charging data before proceeding to step 201. In step 237 in FIG. 2K, the cellular traffic monitoring system utilizes a charging algorithm which assumes that the SDF is non-deducible from the detected application, regardless of whether or not the SDF is deducible from the detected application before proceeding to step 201. In step 239 in FIG. 2L, a PCRF generates a charging rule in accordance with subscriber data and sends the charging rule to the TDF module, where the TDF module applies the charging rule within an application-based charging operation before proceeding to step 201. In step 241 in FIG. 2M, a PCRF provides to the TDF module all downlink-direction SDFs that are covered by at least one Policy Charging and Control (PCC) rule and the TDF module enforces a bandwidth limitation in downlink direction for the downlink-direction SDFs before proceeding to step 201. Alternatively, following step 241, in step 243 if the downlink-direction SDFs belong to an application that requires reporting to a charging system, the TDF module (a) obtains a usage monitoring report about usage of the downlink-direction SDFs, and (b) utilizes the usage monitoring report to prevent over-charging before proceeding to step 201. In another alternative, following step 241, in step 245 if the downlink-direction SDFs belong to an application that requires reporting to a charging system, the PCRF adjusts an Application Data and Control (ADC) rule for the application in downlink direction to match an enforcement action defined in one or more PCC Rules for the SDFs belonging to the detected application before proceeding to step 201. In still another alternative, following step 241, in step 247 if the downlink-direction*

*SDFs belong to an application that requires reporting to a charging system, the TDF module (a) obtains Quality of Service (QoS) information about the downlink-direction SDFs, and (b) transfers the QoS information about the downlink-direction SDFs to a charging system together with an application ID corresponding to the downlink-direction SDFs before proceeding to step 201.*

Figure 3A:
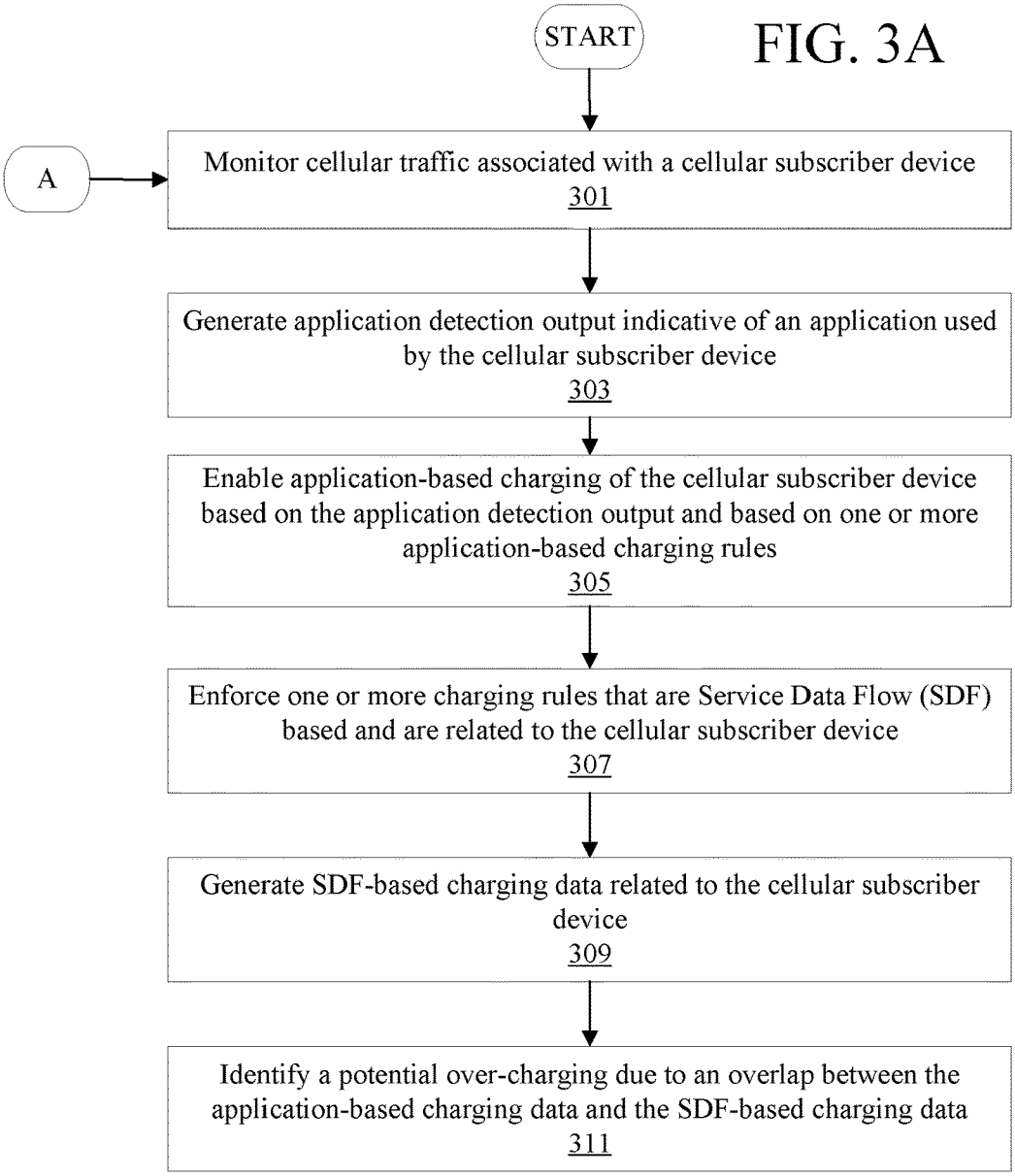
*FIGS. 3A-3B are flow diagrams illustrating the operation of a cellular traffic monitoring system according to the disclosure.*
Figure 3B:
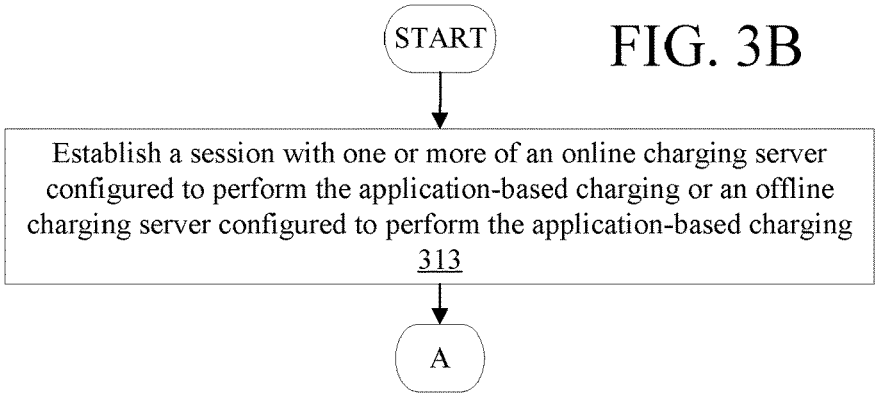

*FIGS. 3A-3B are flow diagrams illustrating the operation of a cellular traffic monitoring apparatus according to the disclosure utilizing one or more processors and memory storing instructions that, when executed by the one or more processor, cause the apparatus to perform the operation of FIG. 3A or FIG. 3B. In step 301, the one or more processors monitors cellular traffic associated with a cellular subscriber device. In step 303, the one or more processors generates, based on the monitored cellular traffic, application detection output indicative of an application used by the cellular subscriber device. In step 305, the one or more processors enables application-based charging of the cellular subscriber device based on the application detection output and based on one or more application-based charging rules. In step 307, the one or more processors enforces one or more charging rules that are Service Data Flow (SDF) based and are related to the cellular subscriber device. In step 309, the one or more processors generates SDF-based charging data related to the cellular subscriber device. In step 311, the one or more processors identifies a potential over-charging due to an overlap between the application-based charging data and the SDF-based charging data. In step 313 in FIG. 3B, the one or more processors establishes a session with one or more of an online charging server configured to perform the application-based charging or an offline charging server configured to perform the application-based charging before proceeding to step 301.*

Figure 4A:
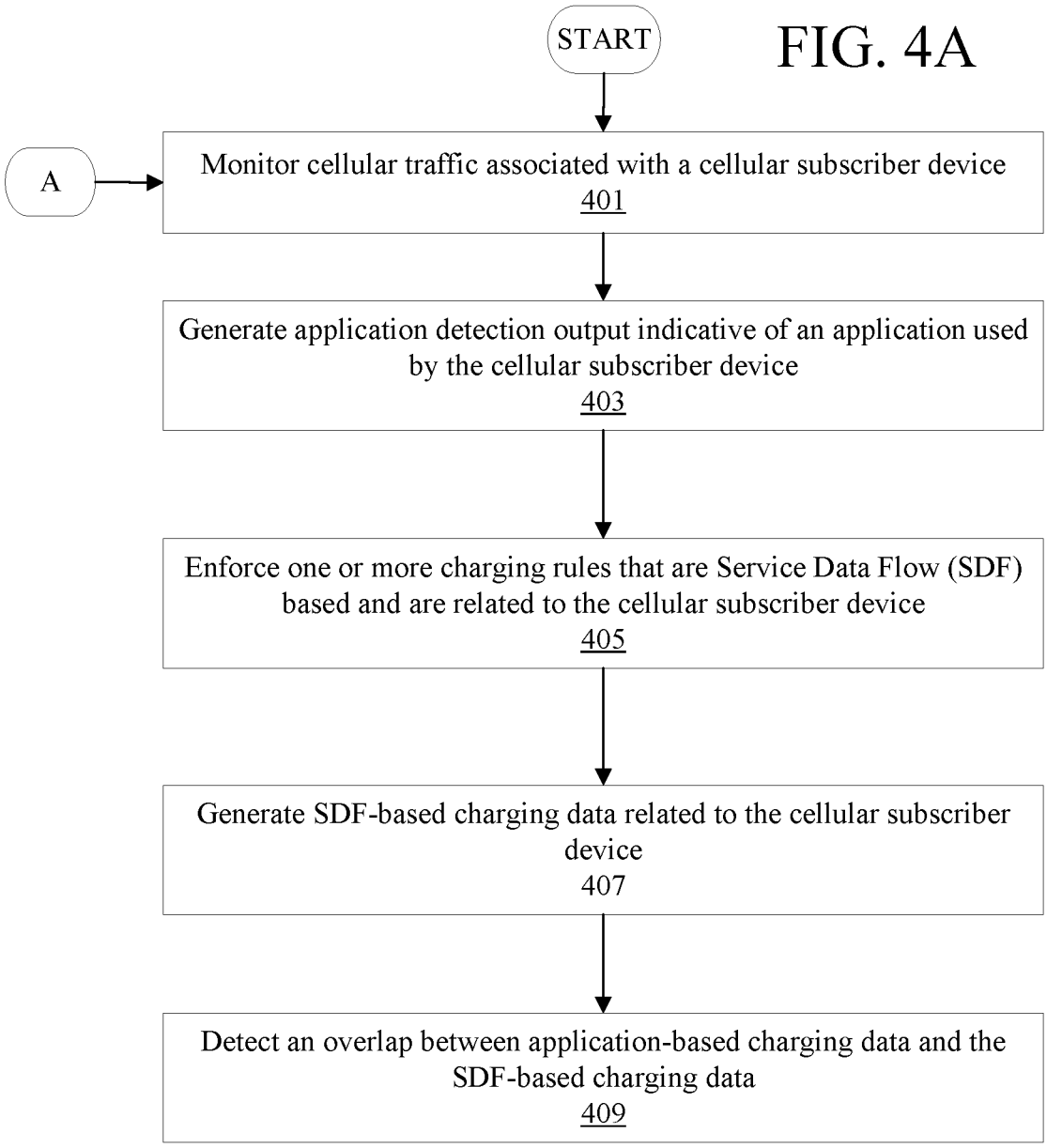
*FIGS. 4A-4B are flow diagrams illustrating the operation of a cellular traffic monitoring system according to the disclosure.*
Figure 4B:
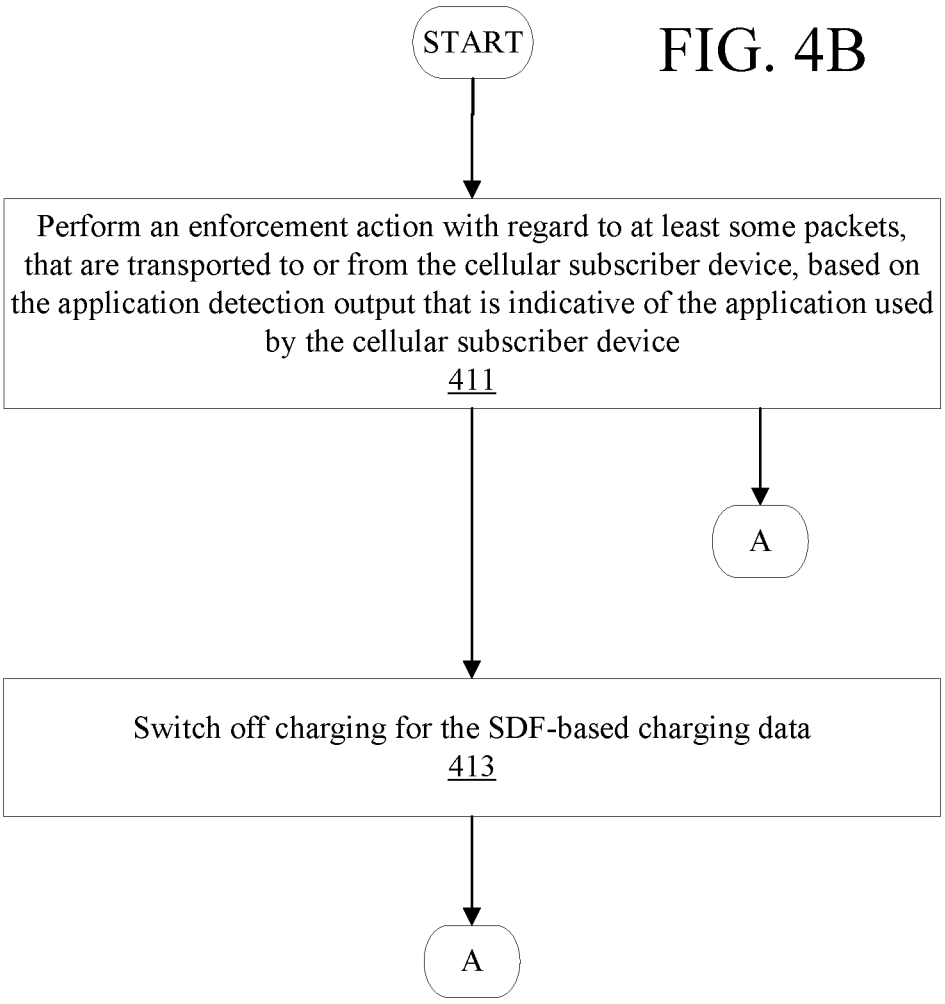

*FIGS. 4A-4B are flow diagrams illustrating the operation of a cellular traffic monitoring system according to the disclosure. In step 401, a computing device monitors cellular traffic associated with a cellular subscriber device. In step 403, application detection output indicative of an application used by the cellular subscriber device is generated based on the monitored cellular traffic. In step 405, one or more charging rules that are Service Data Flow (SDF) based and are related to the cellular subscriber device are enforced. In step 407, SDF-based charging data related to the cellular subscriber device is generated. In step 409, a potential over-charging due to an overlap between the application-based charging data and the SDF-based charging data is identified. In step 411 in FIG. 4B, an enforcement action with regard to at least some packets, that are transported to or from the cellular subscriber device, based on the application detection output that is indicative of the application used by the cellular subscriber device is performed before proceeding to step 401. Alternatively, following step 411, in step 413 charging for the SDF-based charging data is switched off before proceeding to step 401.*

Figure 5:
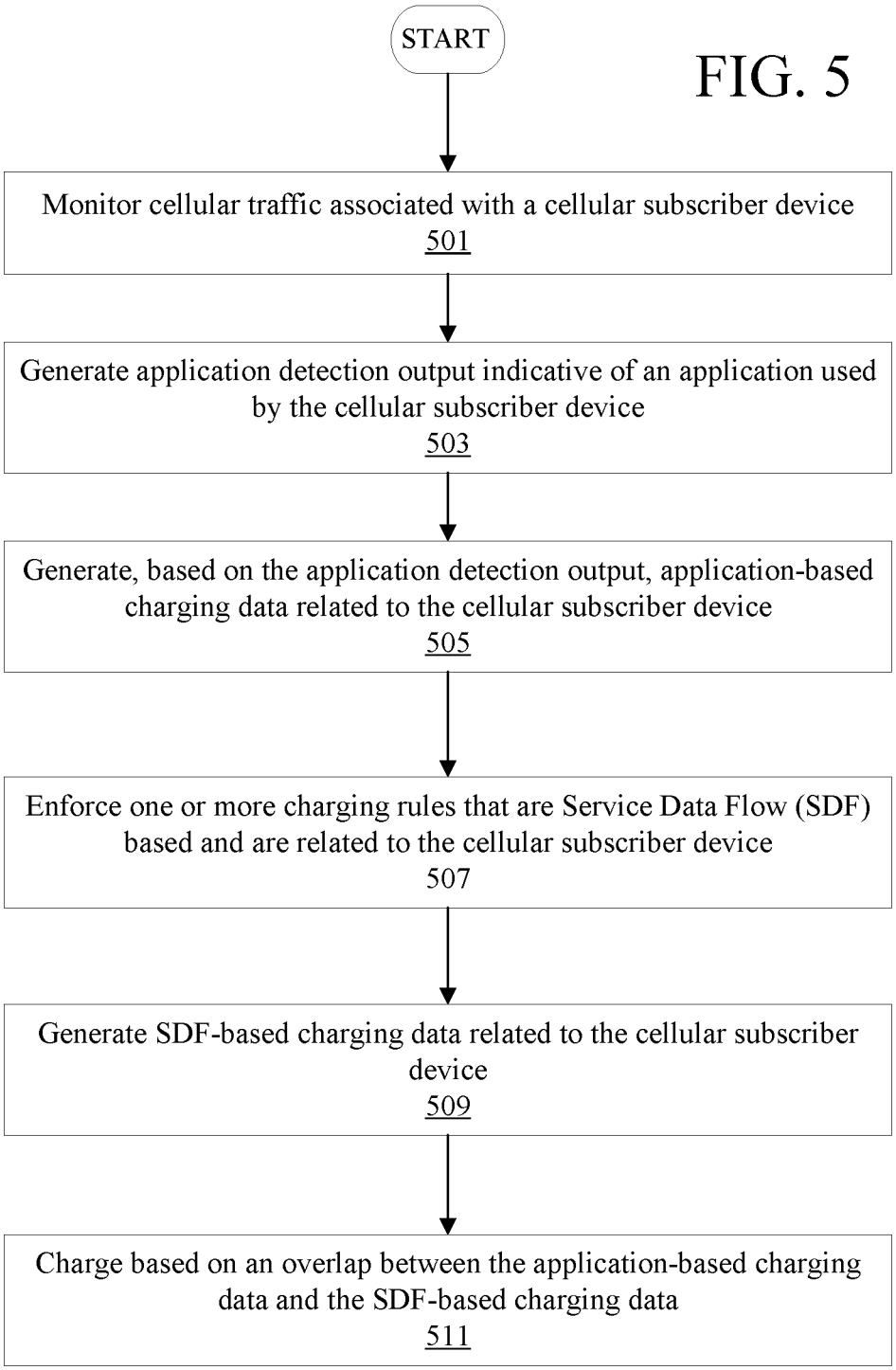
*FIG. 5 is a flow diagram illustrating the operation of a cellular traffic monitoring system according to the disclosure.*

*FIG. 5 is a flow diagram illustrating the operation of a cellular traffic monitoring apparatus according to the disclosure utilizing one or more processors and memory storing instructions that, when executed by the one or more processor, cause the apparatus to perform the operation of FIG. 5. In step 501, the one or more processors monitors cellular traffic associated with a cellular subscriber device. In step 503, the one or more processors generates application detection output indicative of an application used by the cellular subscriber device. In step 505, the one or more processors generates, based on the application detection output, application-based charging data related to the cellular subscriber device. In step 507, the one or more processors enforces one or more charging rules that are Service Data Flow (SDF) based and are related to the cellular subscriber device. In step 309, the one or more processors generates SDF-based charging data related to the cellular subscriber device. In step 311, the one or more processors charges based on an overlap between the application-based charging data and the SDF-based charging data.*

Figure 6:
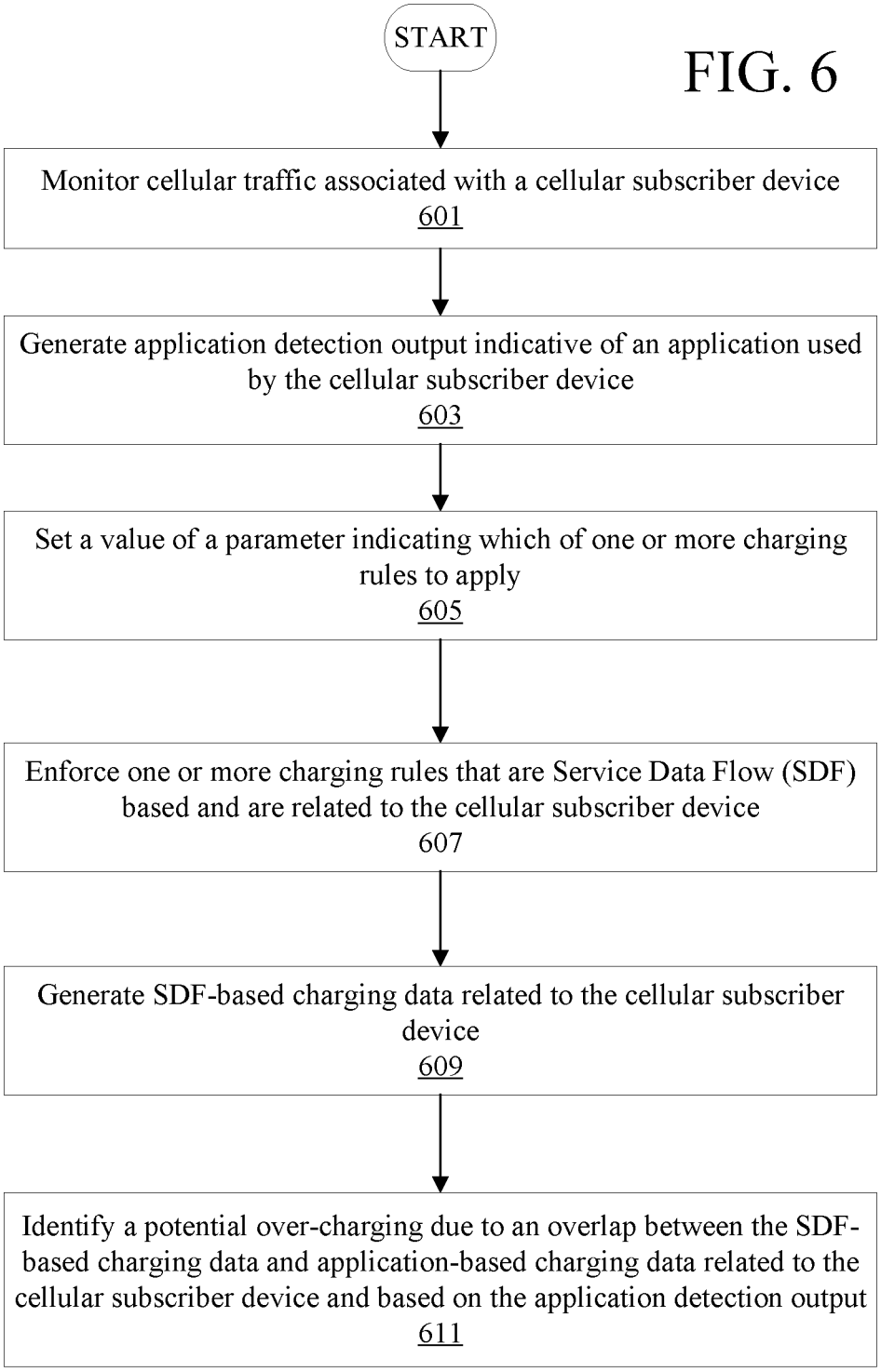
*FIG. 6 is a flow diagram illustrating the operation of a cellular traffic monitoring system according to the disclosure.*

*FIG. 6 is a flow diagram illustrating the operation of a cellular traffic monitoring apparatus according to the disclosure utilizing one or more processors and memory storing instructions that, when executed by the one or more processor, cause the apparatus to perform the operation of FIG. 6. In step 601, the one or more processors monitors cellular traffic associated with a cellular subscriber device. In step 603, the one or more processors generates application detection output indicative of an application used by the cellular subscriber device. In step 605, the one or more processors sets a value of a parameter indicating which of one or more charging rules to apply. In step 607, the one or more processors enforces one or more charging rules that are Service Data Flow (SDF) based and are related to the cellular subscriber device. In step 609, the one or more processors generates SDF-based charging data related to the cellular subscriber device. In step 611, the one or more processors identifies a potential over-charging due to an overlap between the SDF-based charging data and application-based charging data related to the cellular subscriber device and based on the application detection output.*

It is noted that the drawings may show demonstrative implementations of links, interfaces and/or connections; yet other suitable links, interfaces or connections may be used in accordance with the present invention. For example, Gyn interface may be used instead of Gy interface; Gzn interface may be used instead of Gz interface; or the like.

The present invention may be implemented by using any suitable combination of hardware components and/or software modules; and may utilize, for example, processors, controllers, Integrated Circuits (ICs), logic units, memory units, storage units, buffers, modems, radios, transmitters, receivers, transmitters, wireless communication units, wired communication units, cellular communication units, routers, hubs, switches, antennas, power sources, distributed architecture, client/server architecture, peer-to-peer architecture, Operating Systems, drivers, firmware, software applications, stand-alone units or systems, integrated system or units, or any suitable combination thereof.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A cellular traffic monitoring system comprising:

a Traffic Detection Function (TDF) module to monitor cellular traffic associated with a cellular subscriber device, and to generate application detection output indicative of an application used by the cellular subscriber device;

an application-based charging module to generate, based on the application detection output of said TDF module, application-based charging data related to said cellular subscriber device;

a Policy Charging and Enforcement Function (PCEF) module to enforce one or more charging rules that are Service Data Flow (SDF) based and are related to said cellular subscriber device;

an SDF-based charging module to generate SDF-based charging data related to said cellular subscriber device;

a charging correlator module to identify a potential over-charging due to an overlap between the application-based charging data and the SDF-based charging data, wherein at least one of: said TDF module, said application-based charging module, said PCEF module, said SDF-based charging module, and said charging correlator module, is implemented by at least a hardware component.

2. The system of claim 1, further comprising:

an Application Detection and Control (ADC) module, associated with said TDF module, to generate an ADC rule indicating an identity of said application used by the cellular subscriber device;

wherein the PCEF module takes into account said ADC rule for generating SDF-based charging data.

3. The system of claim 1, further comprising:

a Policy and Charging Rules Function (PCRF) to set a value of a Charging Method parameter indicating whether application-based charging or SDF-based charging is to be used in association with cellular traffic of said application used by said cellular subscriber device.

4. The system of claim 1, further comprising:

a Policy and Charging Rules Function (PCRF) to set a value of a Measurement Method parameter indicating a method of measurement for charging to be used in association with cellular traffic of said application used by said cellular subscriber device, wherein said value of the Measurement Method parameter indicates to measure charging in accordance with a charging method selected from the group consisting of:

a charging method based on volume of transferred data, a charging method based on duration of transferred transfer, a charging method based on both duration and volume of transferred data, and an event-based charging method.

5. The system of claim 1, further comprising:

a Policy and Charging Rules Function (PCRF) to set a value of a Service Identifier Level Reporting parameter indicating whether separate usage reports are required to be generated for a current Service Identifier associated with said application used by said cellular subscriber device.

6. The system of claim 1, further comprising:

a Policy and Charging Rules Function (PCRF) set a value of a Service Identifier parameter identifying said application used by said cellular subscriber device, wherein said Service Identifier parameter and a rating group value is utilized via Multiple Services Credit Control (MSCC) per application for application-based charging.

7. The system of claim 1, further comprising:

a Policy and Charging Rules Function (PCRF) to set a value of a Charging Key parameter indicating a charging tariff to be applied if SDF-based charging is to be performed.

8. The system of claim 1, further comprising:

a Generic Tunneling Protocol (GTP) encapsulator to mark in downlink direction, within a GTP extension header, an application type associated with cellular traffic transferred in said downlink direction;

wherein the PCEF module comprises a reflective QoS module to determine, based on said GTP extension header, which cellular packets belong to said application type and to avoid double-counting of said cellular packets in both SDF-based charging and application-based charging.

9. The system of claim 1, further comprising:

a Differentiated Services Code Point (DSCP) marking module to mark Internet Protocol (IP) headers of cellular packets that belong to said application used by the cellular subscriber device, as cellular packets that belong to said application;

wherein the PCEF module comprises a reflective QoS module to determine, based on said IP headers marked by said DSCP marking module, which cellular packets belong to said application and to avoid double-counting of said cellular packets in both SDF-based charging and application-based charging.

10. The system of claim 1, further comprising:

a charging method selector to selectively activate or deactivate an application-based charging module and an SDF-based charging module to prevent over-charging due to an overlap between the application-based charging data and the SDF-based charging data.

11. The system of claim 1, further comprising:

a packet count adjuster to adjust a count of cellular packets transferred to said cellular subscriber device, based on output generated by said charging correlator module, to prevent over-charging due to overlap between the application-based charging data and the SDF-based charging data.

12. The system of claim 1, wherein the system utilizes a charging algorithm which assumes that the SDF is non-deducible from the detected application, regardless of whether or not the SDF is deducible from the detected application.

13. The system of claim 1, further comprising:

a Policy and Charging Rules Function (PCRF) to generate a charging rule in accordance with subscriber data, and to send said charging rule to the TDF module;

wherein the TDF module is to apply said charging rule within an application-based charging operation.

14. The system of claim 1, further comprising:

a Policy and Charging Rules Function (PCRF) to provide to the TDF module all downlink-direction SDFs that are covered by at least one Policy Charging and Control (PCC) rule;

wherein the TDF module is to enforce a bandwidth limitation in downlink direction for said downlink-direction SDFs.

15. The system of claim 14, wherein, if said downlink-direction SDFs belong to an application that requires reporting to a charging system, then the TDF module is (a) to obtain a usage monitoring report about usage of said downlink-direction SDFs, and (b) to utilize said usage monitoring report to prevent over-charging.

16. The system of claim 14, wherein, if said downlink-direction SDFs belong to an application that requires reporting to a charging system, then the PCRF is to adjust an Application Data and Control (ADC) rule for said application in downlink direction, to match an enforcement action defined in one or more PCC Rules for said SDFs belonging to said detected application.

17. The system of claim 14, wherein, if said downlink-direction SDFs belong to an application that requires reporting to a charging system, then the TDF module is (a) to obtain Quality of Service (QoS) information about said downlink-direction SDFs, and (b) to transfer said QoS information about said downlink-direction SDFs to a charging system together with an application ID corresponding to said downlink-direction SDFs.

18. A method of cellular traffic monitoring, the method comprising:

in a Traffic Detection Function (TDF) module, monitoring cellular traffic associated with a cellular subscriber device, and generating application detection output indicative of an application used by the cellular subscriber device;

in an application-based charging module, generating, based on the application detection output of said TDF module, application-based charging data related to said cellular subscriber device;

in a Policy Charging and Enforcement Function (PCEF) module, enforcing one or more charging rules that are Service Data Flow (SDF) based and are related to said cellular subscriber device;

in an SDF-based charging module, generating SDF-based charging data related to said cellular subscriber device;

in a charging correlator module, identifying a potential over-charging due to an overlap between the application-based charging data and the SDF-based charging data.

*19. An apparatus comprising:*

*one or more processors; and*

*memory storing instructions that, when executed by the one or more processor, cause the apparatus to:*

*generate application detection output indicative of an application used by a cellular subscriber device;*

*generate, based on the application detection output, application-based charging data related to the cellular subscriber device;*

*enforce one or more charging rules that are Service Data Flow (SDF) based and are related to the cellular subscriber device;*

*generate SDF-based charging data related to the cellular subscriber device; and*

*identify a potential over-charging due to an overlap between the application-based charging data and the SDF-based charging data.*

*20. The apparatus of claim 19, wherein the instructions, when executed by the one or more processors, further cause the apparatus to:*

*monitor cellular traffic associated with the cellular subscriber device.*

*21. An apparatus comprising:*

*one or more processors; and*

*memory storing instructions that, when executed by the one or more processor, cause the apparatus to:*

*monitor cellular traffic associated with a cellular subscriber device;*

*based on the monitored cellular traffic, generate application detection output indicative of an application used by the cellular subscriber device;*

*enable application-based charging of the cellular subscriber device based on the application detection output and based on one or more application-based charging rules;*

*enforce one or more charging rules that are Service Data Flow (SDF) based and are related to the cellular subscriber device;*

*generate SDF-based charging data related to the cellular subscriber device; and*

*identify a potential over-charging due to an overlap between the application-based charging data and the SDF-based charging data.*

*22. The apparatus of claim 21, wherein the instructions, when executed by the one or more processors, further cause the apparatus to:*

*establish a session with one or more of an online charging server configured to perform the application-based charging or an offline charging server configured to perform the application-based charging.*

*23. A method comprising:*

*monitoring, by a computing device, cellular traffic associated with a cellular subscriber device;*

*based on the monitored cellular traffic, generating application detection output indicative of an application used by the cellular subscriber device;*

*enforcing one or more charging rules that are Service Data Flow (SDF) based and are related to the cellular subscriber device;*

*generating SDF-based charging data related to the cellular subscriber device;*

*detecting an overlap between (i) application-based charging data related to the cellular subscriber device and that is based on the application detection output, and (ii) the SDF-based charging data,*

*performing an enforcement action with regard to at least some packets, that are transported to or from the cellular subscriber device, based on the application detection output that is indicative of the application used by the cellular subscriber device,*

*wherein the enforcement action comprises switching off charging for the SDF-based charging data.*

*24. The method of claim 23,*

*wherein the computing device is a wireless communication unit.*

*25. An apparatus comprising:*

*one or more processors; and*

*memory storing instructions that, when executed by the one or more processor, cause the apparatus to:*

*monitor cellular traffic associated with a cellular subscriber device;*

*generate application detection output indicative of an application used by the cellular subscriber device;*

*generate, based on the application detection output, application-based charging data related to the cellular subscriber device;*

*enforce one or more charging rules that are Service Data Flow (SDF) based and are related to the cellular subscriber device;*

*generate SDF-based charging data related to the cellular subscriber device; and*

*charge based on an overlap between the application-based charging data and the SDF-based charging data.*

*26. An apparatus comprising:*

*one or more processors; and*

*memory storing instructions that, when executed by the one or more processor, cause the apparatus to:*

*monitor cellular traffic associated with a cellular subscriber device;*

*generate application detection output indicative of an application used by the cellular subscriber device;*

*set a value of a parameter indicating which of one or more charging rules to apply;*

*enforce the one or more charging rules that are Service Data Flow (SDF) based and are related to the cellular subscriber device;*

*generate SDF-based charging data related to the cellular subscriber device; and*

*identify a potential over-charging due to an overlap between the SDF-based charging data and application-based charging data related to the cellular subscriber device and based on the application detection output.*

* * * * *